US011724753B2

(12) United States Patent
Smith

(10) Patent No.: US 11,724,753 B2
(45) Date of Patent: *Aug. 15, 2023

(54) VEHICLE CARGO TAILGATE ENCLOSURE

(71) Applicant: Lund Motion Products, Inc., Ann Arbor, MI (US)

(72) Inventor: Anthony Nicholas Smith, Huntington Beach, CA (US)

(73) Assignee: Lund Motion Products. Inc., Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/821,766

(22) Filed: Aug. 23, 2022

(65) Prior Publication Data
US 2022/0396318 A1 Dec. 15, 2022

Related U.S. Application Data

(63) Continuation of application No. 17/091,554, filed on Nov. 6, 2020, now Pat. No. 11,433,953, which is a
(Continued)

(51) Int. Cl.
*B60P 3/40* (2006.01)
*B62D 33/027* (2006.01)
*B62D 33/033* (2006.01)

(52) U.S. Cl.
CPC ....... *B62D 33/033* (2013.01); *B62D 33/0273* (2013.01); *B60P 3/40* (2013.01)

(58) Field of Classification Search
CPC .. B62D 33/027; B62D 33/0273; B62D 33/03; B62D 33/033; B60P 3/40; B60P 7/135; B60P 7/14; B60P 7/15
See application file for complete search history.

(56) References Cited

U.S. PATENT DOCUMENTS

| 171,736 A | 1/1876 | Mooney |
| 341,307 A | 5/1886 | Altschwager |

(Continued)

FOREIGN PATENT DOCUMENTS

| SU | 0629098 | 10/1978 |
| WO | WO 1994/001298 | 1/1994 |
| WO | WO 2013/003488 | 1/2013 |

OTHER PUBLICATIONS

Cooper, Kevin R., Pick up Truck Aerodynamics—Keep Your Tailgate Up, Mar. 8, 2004, SAE, Abstract http://papers.sae.org/2004-01-1146/.
(Continued)

*Primary Examiner* — Gregory A Blankenship
(74) *Attorney, Agent, or Firm* — Knobbe, Martens, Olson & Bear, LLP

(57) ABSTRACT

A tailgate enclosure for use with a vehicle can include a plurality of cross-members, a first upright, a second upright, and only one additional upright. Each of the cross-members can be vertically spaced apart from an adjacent one of the cross-members and can include a first beam, a second beam, and a central beam having a first end and a second end, the central beam positioned at least partially between the first and second beams. The first upright can secure the first beam of each of the cross-members to a first sidewall of the vehicle and the second upright can secure the second beam of each of the cross-members to a second sidewall of the vehicle. The additional upright can be positioned along the central beam of each of the cross-members between the first and second ends of the central beam.

4 Claims, 30 Drawing Sheets

Related U.S. Application Data continuation-in-part of application No. 16/696,276, filed on Nov. 26, 2019, now Pat. No. 11,142,263, which is a continuation of application No. 16/202,832, filed on Nov. 28, 2018, now Pat. No. 10,518,821, which is a continuation of application No. 15/448,952, filed on Mar. 3, 2017, now Pat. No. 10,173,735, which is a continuation of application No. 13/351,191, filed on Jan. 16, 2012, now abandoned, which is a continuation of application No. 12/947,735, filed on Nov. 16, 2010, now abandoned, which is a continuation of application No. 11/924,537, filed on Oct. 25, 2007, now Pat. No. 7,841,638.

(60) Provisional application No. 60/863,339, filed on Oct. 27, 2006.

(56) References Cited

U.S. PATENT DOCUMENTS

| | | |
|---|---|---|
| 540,707 A | 6/1895 | Wolf |
| 600,898 A | 3/1898 | Smith |
| 1,127,854 A | 2/1915 | Belankski |
| 1,214,600 A | 2/1917 | Silverthorne |
| 1,242,035 A | 10/1917 | Pierson et al. |
| 1,266,521 A | 5/1918 | Norquist |
| 1,272,620 A | 7/1918 | Carlson |
| 1,289,997 A | 12/1918 | Wyeth |
| 1,655,777 A | 1/1928 | Weiland |
| 1,655,797 A | 1/1928 | Peck |
| 1,764,615 A | 6/1930 | Edwards |
| 1,812,580 A | 6/1931 | Black |
| 1,930,841 A | 10/1933 | Miniere |
| 2,067,994 A | 1/1937 | Thwaits |
| 2,483,947 A | 10/1949 | Turner |
| 2,514,466 A | 7/1950 | Bildhauer |
| D160,213 S | 9/1950 | Samuelson |
| 2,530,365 A | 11/1950 | Johnson et al. |
| 2,621,357 A | 12/1952 | Stuman |
| 2,626,179 A | 1/1953 | Gonzalez |
| 2,663,447 A | 12/1953 | Westcott |
| RE23,814 E | 4/1954 | Ingram |
| 2,713,897 A | 7/1955 | Teague et al. |
| 2,720,414 A | 10/1955 | Hart |
| 2,795,363 A | 6/1957 | Turner |
| 2,795,383 A | 6/1957 | Turner |
| 2,797,959 A | 7/1957 | Brice |
| 2,872,239 A | 2/1959 | Bowness et al. |
| 2,874,885 A | 2/1959 | Young |
| 3,148,724 A | 9/1964 | Chieger et al. |
| 3,329,385 A | 7/1967 | Dietsch |
| 3,357,670 A | 12/1967 | Larson et al. |
| 3,656,801 A | 4/1972 | Doutt et al. |
| 3,675,959 A | 7/1972 | Hansen et al. |
| 3,734,560 A | 5/1973 | Cramblet |
| 3,773,143 A | 11/1973 | Del Prete et al. |
| 3,902,599 A | 9/1975 | Stromberg |
| 4,023,850 A | 5/1977 | Tillery |
| 4,063,774 A | 12/1977 | Hanks |
| 4,132,335 A | 1/1979 | Ingram |
| 4,136,905 A | 1/1979 | Morgan |
| 4,145,044 A | 3/1979 | Wilson et al. |
| 4,270,681 A | 6/1981 | Ingram |
| 4,295,587 A | 10/1981 | Bott |
| D266,836 S | 11/1982 | Ingram |
| D267,247 S | 12/1982 | Kowalski et al. |
| 4,419,794 A | 12/1983 | Horton, Jr. et al. |
| 4,451,075 A | 5/1984 | Canfield |
| 4,470,716 A | 9/1984 | Welch |
| 4,472,639 A | 9/1984 | Bianchi |
| 4,531,773 A | 7/1985 | Smith |
| 4,585,263 A | 4/1986 | Hesner |
| 4,592,529 A | 6/1986 | Suzuki |
| 4,596,174 A | 6/1986 | Bennett |
| 4,596,417 A | 6/1986 | Bennett |
| 4,635,992 A | 1/1987 | Hamilton |
| 4,650,144 A | 3/1987 | ConraD |
| 4,652,035 A | 3/1987 | Austin, Jr. |
| 4,659,136 A | 4/1987 | Martin et al. |
| D291,789 S | 9/1987 | Noga |
| D294,137 S | 2/1988 | Robson |
| 4,749,226 A | 6/1988 | Heft |
| 4,750,773 A | 6/1988 | Chapline |
| 4,770,458 A | 9/1988 | Burke et al. |
| 4,778,213 A | 10/1988 | Palmer |
| 4,786,119 A | 11/1988 | Smuda |
| 4,793,397 A | 12/1988 | Whiteman |
| D300,734 S | 4/1989 | Kruitbosch |
| 4,824,158 A | 4/1989 | Peters et al. |
| 4,828,312 A | 5/1989 | Kinkel |
| 4,830,242 A | 5/1989 | Painter |
| 4,850,770 A | 7/1989 | Millar, Jr. |
| 4,875,724 A | 10/1989 | Gruber |
| D305,111 S | 12/1989 | Zagner |
| 4,884,317 A | 12/1989 | Liu |
| D308,627 S | 6/1990 | Guffey |
| 4,953,820 A | 9/1990 | Yoder |
| 4,961,677 A | 10/1990 | Downard, Jr. |
| 5,005,892 A | 4/1991 | Haugen et al. |
| 5,011,349 A | 4/1991 | McAndrews |
| 5,024,409 A | 6/1991 | Bohnen |
| 5,037,152 A | 8/1991 | Hendricks |
| 5,037,153 A | 8/1991 | Stark |
| D321,496 S | 11/1991 | Sparham et al. |
| 5,083,829 A | 1/1992 | Fonseca |
| D326,076 S | 5/1992 | Wiese |
| 5,114,203 A | 5/1992 | Carnes |
| 5,123,691 A | 6/1992 | Ginn |
| 5,127,697 A | 7/1992 | St. Marie |
| 5,129,665 A | 7/1992 | Sutter et al. |
| 5,147,103 A | 9/1992 | Ducote |
| 5,154,470 A | 10/1992 | Bringman, Jr. |
| 5,169,200 A | 12/1992 | Pugh |
| 5,170,746 A | 12/1992 | Roose |
| 5,201,532 A | 4/1993 | Salesky et al. |
| 5,201,562 A | 4/1993 | Dorsey |
| D337,934 S | 8/1993 | Young |
| 5,234,122 A | 8/1993 | Cherng |
| 5,251,950 A | 10/1993 | Bernardo |
| 5,253,913 A | 10/1993 | Metivier |
| 5,299,773 A | 4/1994 | Bertrand |
| 5,310,155 A | 5/1994 | Wu |
| 5,330,246 A | 7/1994 | Bernardo |
| 5,357,376 A | 10/1994 | Yoshida |
| 5,380,141 A | 1/1995 | Flowers |
| 5,396,915 A | 3/1995 | Bomar |
| 5,417,340 A | 5/1995 | Anthony |
| 5,421,633 A | 5/1995 | Moore et al. |
| D360,614 S | 7/1995 | Alcocer |
| 5,441,324 A | 8/1995 | Gold |
| 5,443,341 A | 8/1995 | Hamilton |
| 5,456,511 A | 10/1995 | Webber |
| 5,460,393 A | 10/1995 | Tsai |
| 5,468,038 A | 11/1995 | Sauri |
| D365,323 S | 12/1995 | Napierkowski et al. |
| 5,500,983 A | 3/1996 | Lautenschlager |
| 5,540,475 A | 7/1996 | Kersting |
| 5,573,161 A | 11/1996 | Stapleton |
| 5,579,970 A | 12/1996 | Cucheran et al. |
| 5,588,630 A | 12/1996 | Chen-Chao |
| 5,622,296 A | 4/1997 | Pirhonen et al. |
| 5,658,033 A | 8/1997 | Delaune |
| 5,673,958 A | 10/1997 | Gramss |
| 5,685,686 A | 11/1997 | Burns |
| 5,700,047 A * | 12/1997 | Leitner .................... B60P 3/40 296/26.11 |
| 5,730,342 A | 3/1998 | Tien |
| 5,743,589 A | 4/1998 | Felker |
| D394,639 S | 5/1998 | Carter |
| 5,752,800 A | 5/1998 | Brincks et al. |
| 5,755,480 A | 5/1998 | Bryan |
| 5,765,892 A | 6/1998 | Covington |
| 5,772,062 A | 6/1998 | Gramss |

(56) References Cited

U.S. PATENT DOCUMENTS

| | | |
|---|---|---|
| 5,775,759 A | 7/1998 | Cummings |
| 5,782,282 A | 7/1998 | Chen |
| 5,788,311 A | 8/1998 | Tibbals |
| D398,284 S | 9/1998 | Carter et al. |
| 5,806,907 A | 9/1998 | Martinus et al. |
| D399,481 S | 10/1998 | Larson et al. |
| 5,816,637 A | 10/1998 | Adams et al. |
| 5,820,188 A | 10/1998 | Nash |
| 5,823,596 A | 10/1998 | Kulesza |
| 5,839,614 A | 11/1998 | Brown |
| 5,853,116 A | 12/1998 | Schreiner |
| 5,857,724 A | 1/1999 | Jarman |
| 5,862,964 A | 1/1999 | Moliner |
| 5,893,500 A | 4/1999 | Cucheran et al. |
| D410,429 S | 6/1999 | Derecktor |
| 5,911,464 A | 6/1999 | White |
| 5,913,465 A | 6/1999 | Potter et al. |
| 5,924,614 A | 7/1999 | Kuntze et al. |
| 5,924,753 A | 7/1999 | DiBassie |
| 5,984,379 A | 11/1999 | Michel et al. |
| D417,859 S | 12/1999 | Leitner et al. |
| D418,106 S | 12/1999 | Leitner et al. |
| 5,997,066 A | 12/1999 | Scott |
| 6,019,410 A | 2/2000 | Trostle et al. |
| 6,039,520 A | 3/2000 | Cheng |
| 6,059,159 A | 5/2000 | Fisher |
| 6,076,881 A | 6/2000 | Tucker |
| 6,082,801 A | 7/2000 | Owen et al. |
| 6,089,639 A | 7/2000 | Wojnowski |
| 6,092,263 A | 7/2000 | Boue et al. |
| 6,099,070 A | 8/2000 | Yocum |
| 6,102,265 A | 8/2000 | Stapleton |
| 6,112,964 A | 9/2000 | Cucheran et al. |
| 6,112,965 A | 9/2000 | Lundgren |
| 6,113,173 A | 9/2000 | Leitner et al. |
| 6,113,176 A | 9/2000 | Bernardo |
| 6,113,328 A | 9/2000 | Claucherty |
| 6,120,076 A | 9/2000 | Adsit et al. |
| 6,123,305 A | 9/2000 | LukasavitZ |
| 6,129,490 A | 10/2000 | Erskine et al. |
| 6,149,219 A | 11/2000 | Schambre et al. |
| 6,227,593 B1 | 5/2001 | De Valcourt |
| 6,256,844 B1 | 7/2001 | Wheatley |
| 6,257,637 B1 | 7/2001 | Reed |
| 6,269,990 B1 | 8/2001 | Gray |
| 6,283,525 B1 | 9/2001 | Morse |
| 6,338,515 B1 | 1/2002 | Munhall |
| 6,340,190 B1 | 1/2002 | Rosebrugh et al. |
| 6,350,089 B1 | 2/2002 | Tekavec |
| 6,352,295 B1 | 3/2002 | Leitner |
| 6,378,926 B1 | 4/2002 | Renze et al. |
| 6,390,427 B1 | 5/2002 | McConnell et al. |
| 6,402,215 B1* | 6/2002 | Leitner ............... B62D 33/0273 |
| | | 296/26.11 |
| 6,422,627 B1 | 7/2002 | Kuhn et al. |
| 6,425,618 B1 | 7/2002 | Garland et al. |
| 6,454,338 B1 | 9/2002 | Glickman et al. |
| 6,471,277 B1 | 10/2002 | Scensny et al. |
| 6,488,249 B1 | 12/2002 | Girardi et al. |
| 6,494,520 B2 | 12/2002 | Brzenchek et al. |
| 6,513,688 B2* | 2/2003 | Kmita ............... B60R 5/041 |
| | | 224/403 |
| 6,540,123 B1* | 4/2003 | Kmita ............... B60P 3/40 |
| | | 224/403 |
| 6,550,841 B1 | 4/2003 | Burdon et al. |
| 6,557,918 B2 | 5/2003 | Iafrate et al. |
| 6,561,560 B2 | 5/2003 | Brown et al. |
| 6,585,465 B1 | 7/2003 | Hammond et al. |
| 6,598,922 B2 | 7/2003 | Morse et al. |
| 6,604,898 B2 | 8/2003 | Price |
| 6,607,228 B2 | 8/2003 | Carter, III et al. |
| 6,626,478 B1 | 9/2003 | Minton |
| 6,637,707 B1 | 10/2003 | Gates et al. |
| D485,800 S | 1/2004 | Smith et al. |
| 6,676,182 B2 | 1/2004 | Fitts |
| 6,719,261 B2 | 4/2004 | Wadsworth |
| 6,719,345 B2 | 4/2004 | Ootsuka et al. |
| 6,722,541 B1 | 4/2004 | Aftanas et al. |
| 6,742,973 B1 | 6/2004 | Hendrix et al. |
| 6,752,575 B1 | 6/2004 | Moore et al. |
| 6,789,832 B2 | 9/2004 | Gort et al. |
| 6,796,471 B2 | 9/2004 | Aftanas et al. |
| 6,805,392 B2 | 10/2004 | Leitner et al. |
| 6,843,394 B2 | 1/2005 | Aki |
| D501,443 S | 2/2005 | Jones et al. |
| D504,384 S | 4/2005 | StrascheWski |
| 6,874,747 B2 | 4/2005 | Oh |
| 6,889,878 B2 | 5/2005 | Parsons |
| 6,913,175 B2 | 7/2005 | Martin |
| 6,918,624 B2 | 7/2005 | Miller et al. |
| 6,923,488 B2 | 8/2005 | Bruford et al. |
| 6,941,654 B1 | 9/2005 | Sears |
| 6,948,763 B2 | 9/2005 | Robbins |
| 6,966,595 B2 | 11/2005 | Bruford et al. |
| 6,983,972 B2 | 1/2006 | Tan et al. |
| 6,994,389 B1 | 2/2006 | Graffy et al. |
| 6,997,657 B1 | 2/2006 | Saward |
| 7,007,995 B1* | 3/2006 | Scarberry ............... B60P 3/40 |
| | | 296/26.11 |
| 7,040,849 B2 | 5/2006 | Cunningham et al. |
| 7,063,366 B2 | 6/2006 | Leitner et al. |
| 7,093,870 B2 | 8/2006 | Kim et al. |
| 7,100,956 B1 | 9/2006 | Wilkins |
| 7,111,886 B1 | 9/2006 | Miller et al. |
| 7,121,604 B2* | 10/2006 | Reed ............... B60P 3/40 |
| | | 296/26.11 |
| 7,152,902 B2 | 12/2006 | Moen et al. |
| 7,159,918 B2 | 1/2007 | Lussier |
| 7,175,218 B1* | 2/2007 | Keene ............... B60P 3/40 |
| | | 296/57.1 |
| 7,175,377 B2 | 2/2007 | Womack et al. |
| 7,182,380 B2 | 2/2007 | Nagle |
| 7,195,432 B2* | 3/2007 | Earle ............... B60P 7/14 |
| | | 410/121 |
| 7,229,116 B1 | 5/2007 | Bruford et al. |
| D544,826 S | 6/2007 | Smith |
| 7,226,100 B1 | 6/2007 | Willey et al. |
| 7,240,940 B2* | 7/2007 | Leitner ............... B62D 33/0273 |
| | | 296/26.11 |
| 7,258,387 B2 | 8/2007 | Weldy |
| 7,267,387 B1 | 9/2007 | Bruford et al. |
| D553,072 S | 10/2007 | Smith |
| 7,287,943 B1 | 10/2007 | SaWard |
| 7,303,222 B2 | 12/2007 | Wilkins |
| 7,334,830 B2 | 2/2008 | Weldy |
| 7,347,473 B2 | 3/2008 | Miller et al. |
| D568,230 S | 5/2008 | Smith |
| 7,393,035 B2 | 7/2008 | Leitner et al. |
| 7,413,231 B1 | 8/2008 | Wood et al. |
| 7,464,976 B2 | 12/2008 | Smith |
| 7,488,021 B1 | 2/2009 | Roos et al. |
| 7,513,543 B2 | 4/2009 | Erskine |
| 7,547,054 B2 | 6/2009 | Leitner |
| 7,549,828 B2 | 6/2009 | Smith |
| D597,924 S | 8/2009 | Smith |
| 7,628,442 B1 | 12/2009 | Spencer et al. |
| 7,654,598 B2 | 2/2010 | Leitner et al. |
| 7,654,599 B2* | 2/2010 | Stewart ............... B60P 3/40 |
| | | 296/26.11 |
| 7,665,799 B1 | 2/2010 | Winter, IV |
| 7,681,935 B2 | 3/2010 | Leitner et al. |
| D627,703 S | 11/2010 | McLaughlin |
| 7,823,957 B2 | 11/2010 | Williamson |
| 7,841,638 B2 | 11/2010 | Smith |
| 7,845,887 B2 | 12/2010 | Smith |
| 7,857,371 B2 | 12/2010 | Leitner |
| 7,878,568 B2 | 2/2011 | Wu |
| 7,905,536 B2 | 3/2011 | Yue |
| 7,905,539 B2 | 3/2011 | De Carli |
| 7,959,203 B2 | 6/2011 | Smith |
| 8,020,737 B2 | 9/2011 | Sweeney |
| 8,020,912 B2 | 9/2011 | Lounds |
| 8,146,982 B2 | 4/2012 | Williamson et al. |
| 8,297,677 B2 | 10/2012 | Leitner et al. |

(56) References Cited

U.S. PATENT DOCUMENTS

| | | | |
|---|---|---|---|
| 8,366,173 | B2 | 2/2013 | Xu |
| 8,480,154 | B2 | 7/2013 | Yue |
| 8,678,459 | B1 | 3/2014 | Win |
| 8,727,415 | B2 * | 5/2014 | Smith .................. B62D 33/033 296/26.11 |
| 8,807,625 | B2 | 8/2014 | Garska |
| 9,156,507 | B1 | 10/2015 | Reed |
| 9,352,790 | B2 | 5/2016 | Smith |
| 9,586,514 | B2 | 3/2017 | Asao et al. |
| 9,834,259 | B2 | 12/2017 | Smith |
| 10,086,775 | B2 | 3/2018 | Spahn et al. |
| 10,131,384 | B2 | 11/2018 | Raines et al. |
| 10,173,735 | B2 | 1/2019 | Smith |
| 10,518,821 | B2 | 12/2019 | Smith |
| 11,142,263 | B2 * | 10/2021 | Smith ................ B62D 33/0273 |
| 11,433,953 | B2 * | 9/2022 | Smith .................. B62D 33/033 |
| 2001/0038218 | A1 | 11/2001 | Clare et al. |
| 2001/0038219 | A1 | 11/2001 | Clare et al. |
| 2001/0038230 | A1 | 11/2001 | Clare et al. |
| 2002/0000732 | A1 | 1/2002 | Sanders |
| 2002/0096901 | A1 | 7/2002 | Iafrate et al. |
| 2002/0153737 | A1 | 10/2002 | Fitts |
| 2003/0111858 | A1 | 6/2003 | Carter, III et al. |
| 2003/0116986 | A1 | 6/2003 | Ootsuka et al. |
| 2004/0056499 | A1 | 3/2004 | McNally |
| 2004/0074939 | A1 | 4/2004 | Aftanas et al. |
| 2004/0080174 | A1 | 4/2004 | Buelna |
| 2004/0134953 | A1 | 7/2004 | Perez |
| 2005/0077747 | A1 | 4/2005 | De Gaillard et al. |
| 2005/0088848 | A1 | 4/2005 | Miller et al. |
| 2006/0091170 | A1 | 5/2006 | Almhil |
| 2006/0091171 | A1 | 5/2006 | Wardell et al. |
| 2006/0208524 | A1 | 9/2006 | Brown et al. |
| 2006/0213941 | A1 | 9/2006 | Sweeney |
| 2006/0263163 | A1 | 11/2006 | Harberts et al. |
| 2006/0283900 | A1 | 12/2006 | Stapleton |
| 2007/0170739 | A1 | 7/2007 | Sims |
| 2007/0262602 | A1 | 11/2007 | Nagle |
| 2008/0012373 | A1 | 1/2008 | Leitner |
| 2008/0101883 | A1 | 5/2008 | Derecktor |
| 2008/0111390 | A1 * | 5/2008 | Smith ................ B62D 33/0273 296/50 |
| 2009/0020576 | A1 | 1/2009 | Gale |
| 2009/0108612 | A1 * | 4/2009 | Smith .................. B62D 33/027 296/50 |
| 2010/0283280 | A1 | 11/2010 | Kohlstrand et al. |
| 2011/0175387 | A1 | 7/2011 | Smith |
| 2012/0319423 | A1 | 12/2012 | Smith |
| 2013/0001973 | A1 | 1/2013 | Smith |
| 2013/0119693 | A1 * | 5/2013 | Leitner ..................... B60P 3/40 296/26.11 |
| 2014/0339845 | A1 | 11/2014 | Lang et al. |
| 2015/0360734 | A1 | 12/2015 | McKinney et al. |
| 2017/0305325 | A1 * | 10/2017 | Buckhalt .................. B60P 3/40 |
| 2018/0237079 | A1 | 8/2018 | Smith |
| 2018/0265008 | A1 | 9/2018 | Spahn et al. |
| 2018/0334071 | A1 | 11/2018 | Stojkovic et al. |
| 2021/0053627 | A1 * | 2/2021 | Smith .................. B62D 33/033 |
| 2022/0396318 | A1 * | 12/2022 | Smith ................ B62D 33/0273 |

OTHER PUBLICATIONS

GM, GMC Pickups 101: Busting Myths of Truck Aerodynamics, May 16, 2013 http://media.gm.com/content/media/us/en/gm/news.detail.html/content/Pages/news/us/en/2013/May/0516-gmc-pickup-aero.html.

Complaint, *Ford Motor Company v. 89908, Inc. d/b/a AMP Research and/or American Moto Products Research*, Case No. 2:06-cv-13316, U.S. District Court for the Eastern District of Michigan, Southern Division, filed Jul. 21, 2006.

Defendant's Opposition to Plaintiff's Motion for Relief from Judgment filed on Sep. 15, 2009, *E-Z Load Gate, Inc. v. American Moto Products, Inc. et al*, Case No. 6:07-cv-01962, U.S. District Court, Middle District of Florida, filed Oct. 6, 2009.

Order Denying Motion to Enforce Judgment and Motion for Relief for Judgment, *E-Z Load Gate, Inc. v. American Moto Products, Inc. et al*, Case No. 6:07-cv-01962, U.S. District Court, Middle District of Florida, filed Oct. 6, 2009.

Summons and Complaint, *EZ Load Gate, Inc. v. 89908, Inc. d/b/a/ AMP Research*, Case No. 2009-CA94353-15-K, In the Circuit Court, Eighteenth Judicial Circuit, Seminole County, Florida, filed Nov. 10, 2009.

Complaint, *89908, Inc. d/b/a AMP Research v. E-Z Load Gate, Inc.*, Case No. 2:09-cv-02165, United States District Court for the District of Nevada, filed Nov. 11, 2009.

Defendant's Motion to Dismiss or Stay Case, filed on Dec. 7, 2009, *E-Z Load Gate, Inc. v. 89908, Inc. d/b/a AMP Research*, Case No. 2009-CA-9453-15-K, Circuit Court Eighteenth Judicial Circuit, Seminole County, Florida, filed Nov. 10, 2009.

Defendant's Motion to Dismiss, alternatively, Motion to Transfer, filed on filed on Dec. 9, 2009, *89908, Inc. d/b/a AMP Research v. E-Z Load Gate, Inc.*, Case No. 2:09-cv-02165-PMP-PAL; U.S. District Court, District of Nevada, filed Nov. 4, 2008.

Plaintiff's Opposition to Defendant's Motion to Dismiss, alternatively, Motion to Transfer, filed on Dec. 28, 2009, *89908, Inc. d/b/a AMP Research v. E-Z Load Gate, Inc.*, Case No. 2:09-cv-02165-PMP-PAL; U.S. District Court, District of Nevada, filed Nov. 4, 2008.

Affidavit of Floyd Jacobs in Support of Defendant's Motion for Summary Judgment, filed on Jan. 14, 2010, *89908, Inc. d/b/a AMP Research v. E-Z Load Gate, Inc.*, Case No. 2:08-cv-01515, U.S. District Court, District of Nevada, filed Nov. 14, 2008.

Affidavit of Stephen Earle in Support of Defendant's Motion for Summary Judgment, filed on Jan. 14, 2010, *89908, Inc. d/b/a AMP Research v. E-Z Load Gate, Inc.*, Case No. 2:08-cv-01515, U.S. District Court, District of Nevada, filed Nov. 14, 2008.

Defendant's Motion for Summary Judgment, filed on Jan. 14, 2010, *89908, Inc. d/b/a AMP Research v. E-Z Load Gate, Inc.*, Case No. 2:08-cv-01515, U.S. District Court, District of Nevada, filed Nov. 14, 2008.

Order Denying Motion to Dismiss, alternatively, Motion to Transfer, issued on Jan. 14, 2010, *89908, Inc. d/b/a AMP Research v. E-Z Load Gate, Inc.*, Case No. 2:09-cv-02165-PMP-PAL; U.S. District Court, District of Nevada, filed Nov. 4, 2008.

Defendant's Answer to Complaint filed Jan. 27, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.

Final Consent Judgment and Permanent Injunction, filed on Jan. 29, 2010, *89908, Inc., d/b/a AMP Research v. E-Z Load Gate, Inc.*, Case No. 2:08-cv-01515-LDG-(PAL), U.S. District Court, District of Nevada, filed Nov. 14, 2008.

Plaintiffs Amended Complaint filed Mar. 5, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.

Plaintiff s Second Amended Complaint (Demand for Jury Trial) filed Mar. 23, 2010 in 89908, *Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.

Answer to Second Amended Complaint filed Apr. 22, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.

Motion to Strike E-Z Load's Inequitable Conduct Defense filed May 5, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.

Defendant's Response to Motion to Strike Affirmative Defense filed May 22, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.

(56) References Cited

OTHER PUBLICATIONS

Reply in Support of Motion to Strike Inequitable Conduct Defense filed Jun. 4, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.
Order Granting Plaintiff's Motion to Strike E-Z Load's Inequitable Conduct Defense (Doc. #45) filed Jun. 16, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.
Declaration of Anthony Smith in Support of Plaintiff's Motion for Summary Judgment of Infringement (Doc. #50-2) filed Oct. 18, 2010 in *89908, Inc. d/b/a AMPResearch v. E-Z Load Gate, Inc., E-Z Load, LLC, E-Z Load Enterprises, LLC*, Case No. 2:09-cv-02165-PMP-PAL, US. District Court, District of Nevada.
Plaintiffs Motion for Summary Judgment of Infringement (Doc. #50) filed Oct. 18, 2010 in *89908, Inc. d/b/a AMP Research v. E-Z Load Gate, Inc., E-Z Load, LLC, E-Z Load Enterprises, LLC*, Case No. 2:09-cv02165-PMP-PAL, US. District Court, District of Nevada.
Declaration of Stephen Earle in Opposition to Plaintiff's Motion for Summary Judgment (Doc. #52-1) filed Nov. 11, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.
Defendant's Opposition to Plaintiffs Motion for Summary Judgment of Infringement (Doc. # 52) filed Nov. 11, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.
Plaintiffs Reply in Support of its Motion for Summary Judgment of Infringement (Doc. #53) filed Nov. 22, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, US. District Court, District of Nevada.
Order Granting Plaintiff's Motion for Summary Judgment of Infringement (Doc. #55) filed Dec. 28, 2010 in *89908, Inc. d/b/a AMP Research v. E-Z Load Gate, Inc., E-Z Load, LLC, E-Z Load Enterprises, LLC*, Case No. 2:09-cv-02165-PMP-PAL, U.S. District Court, District of Nevada.

\* cited by examiner

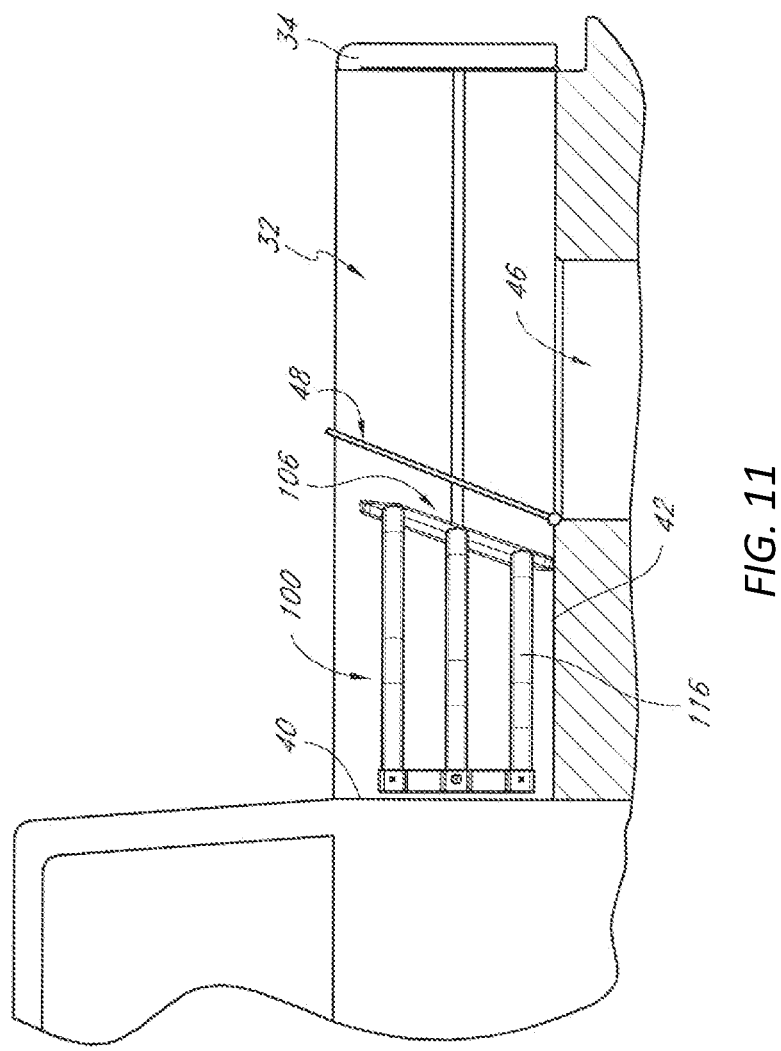

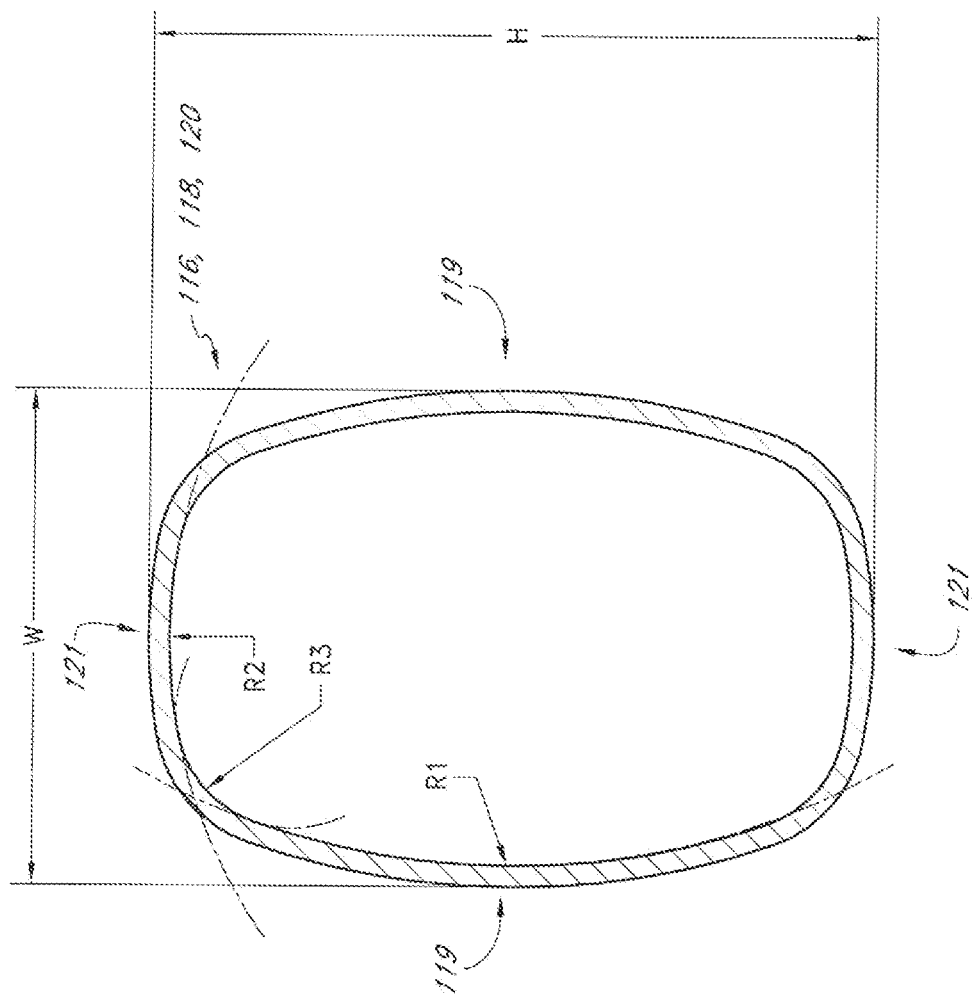

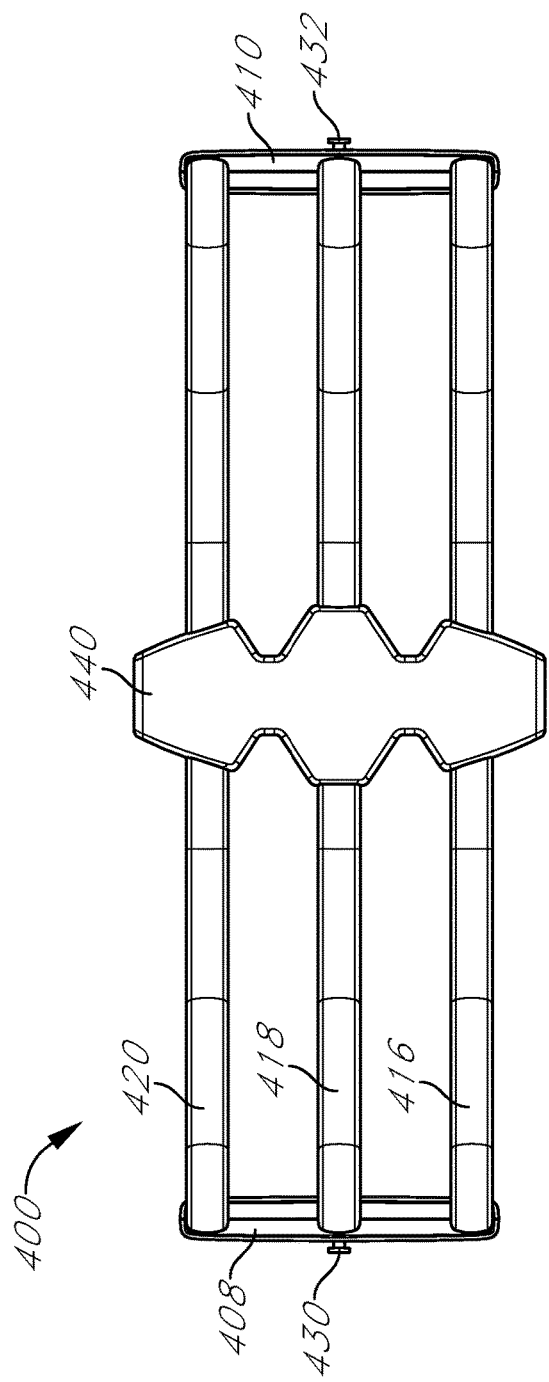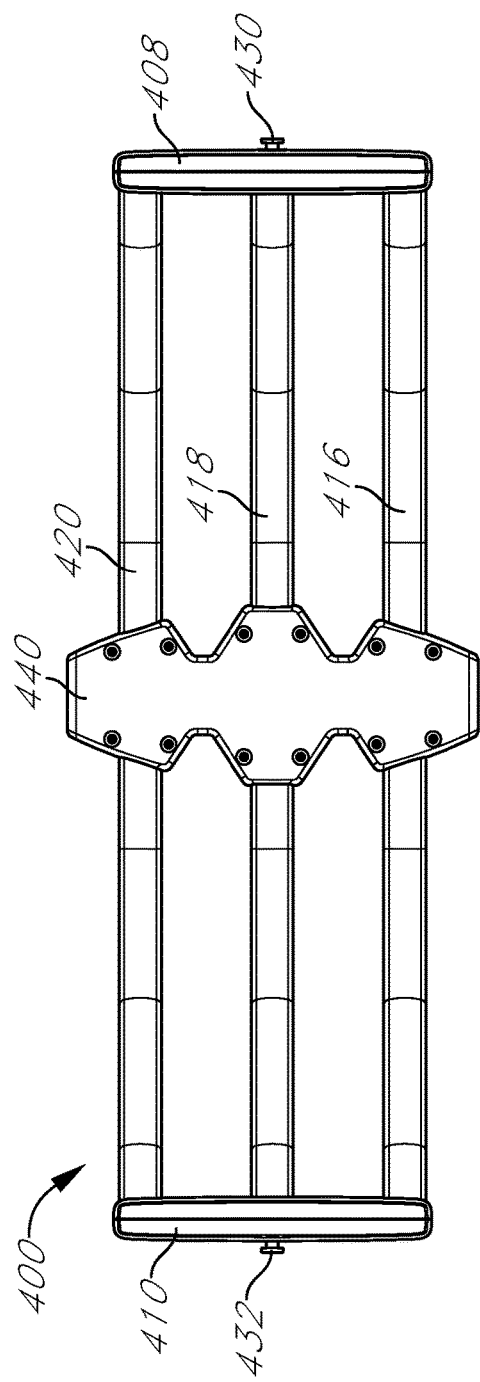
FIG. 27
FIG. 28

VEHICLE CARGO TAILGATE ENCLOSURE

CROSS-REFERENCE TO RELATED APPLICATIONS

This application is a continuation of U.S. patent application Ser. No. 17/091,554, entitled "VEHICLE CARGO TAILGATE ENCLOSURE," filed Nov. 6, 2020, which is a continuation-in-part of U.S. patent application Ser. No. 16/696,276, entitled "VEHICLE CARGO TAILGATE ENCLOSURE," filed on Nov. 26, 2019, which is a continuation of U.S. patent application Ser. No. 16/202,832, entitled "VEHICLE CARGO TAILGATE ENCLOSURE," filed on Nov. 28, 2018, now U.S. Pat. No. 10,518,821, which is a continuation of U.S. patent application Ser. No. 15/448,952, entitled "VEHICLE CARGO TAILGATE ENCLOSURE," filed on Mar. 3, 2017, now U.S. Pat. No. 10,173,735, which is a continuation of U.S. patent application Ser. No. 13/351,191, entitled "VEHICLE CARGO TAILGATE ENCLOSURE," filed on Jan. 16, 2012, which is a continuation of U.S. patent application Ser. No. 12/947,735, entitled "VEHICLE CARGO TAILGATE ENCLOSURE," filed on Nov. 16, 2010, which is a continuation of U.S. patent application Ser. No. 11/924,537, entitled "VEHICLE CARGO TAILGATE ENCLOSURE," filed on Oct. 25, 2007, now U.S. Pat. No. 7,841,638, which claims priority to U.S. Provisional Patent Application No. 60/863,339, entitled "VEHICLE CARGO TAILGATE ENCLOSURE," filed on Oct. 27, 2006. The entirety of each of the above applications is expressly incorporated by reference herein and made a part of the present specification.

BACKGROUND OF THE INVENTION

Field of the Invention

The present application generally relates to a cargo tailgate enclosure for a pickup truck.

Description of the Related Art

Pick-up trucks are extremely popular. One of their primary advantages is the ability to haul loads in the storage bed located behind the cab of the vehicle. Unfortunately, often the storage bed is of an undesirable configuration for the load being transported. In particular, it is not unusual for the load to be larger than the truck bed, so that the tailgate of the truck needs to be lowered to enable the load to be adequately transferred. Unfortunately, this raises the risk that the load will fall out of the back of the truck, or that the load will need to be tied down, taking additional time.

For this reason, various truck tailgate enclosures have been developed. Despite the great success and excellent functionality of previous tailgate enclosures, new areas exist in which to further improve the cargo tailgate enclosure.

SUMMARY OF THE INVENTION

In some aspects of the disclosure, a vehicle tailgate enclosure for use with a vehicle having a first sidewall, a second sidewall opposite the first sidewall, a cargo bed, and a tailgate comprises a plurality of cross-members, a first upright, a second upright, and only one additional upright. The plurality of cross-members can be configured to extend from the first sidewall to the second sidewall over the tailgate of the vehicle when the vehicle tailgate enclosure is in use. Each of the plurality of cross-members can be vertically spaced apart from an adjacent one of the plurality of cross-members. Each of the plurality of cross-members can comprise: a first beam having a first end and a second end opposite the first end; a second beam having a first end and a second end opposite the first end; and a central beam having a first end and a second end opposite the first end, the central beam positioned at least partially between the first and second beams. The first upright can be configured to receive the first end of the first beam of each of the plurality of cross-members. The first upright can be further configured to at least partially secure the vehicle tailgate enclosure to a portion of the first sidewall of the vehicle. The second upright can be configured to receive the first end of the second beam of each of the plurality of cross-members. The second upright can be further configured to at least partially secure the vehicle tailgate enclosure to a portion of the second sidewall of the vehicle. The additional upright can be positioned along the central beam of each of the plurality of cross-members between the first and second ends of the central beam, the additional upright comprising a plurality of channels vertically spaced from one another, each of the plurality of channels configured to receive and secure the second ends of the first and second beams to the first and second ends of the central beam.

In some embodiments, the additional upright is positioned along the central beam of each of the plurality of cross-members equidistant from the first and second uprights. In some embodiments, the additional upright comprises a plurality of flared portions and one or more stem portions, each of the plurality of flared portions including one of the plurality of channels.

In some embodiments, each of the plurality of flared portions is separated from an adjacent one of the plurality of flared portions by one of the one or more stem portions, and widths of the plurality of flared portions are greater than a width of the one or more stem portions, the widths of the plurality of flared portions and width of the one or more stem portions extending in a direction parallel to a length of the central beam.

In some embodiments, the plurality of cross-members comprises three cross-members, the plurality of channels comprises three channels, the plurality of flared portions comprises three flared portions, and the one or more stem portions comprises two stem portions. In some embodiments, the three flared portions comprises a first flared portion, a second flared portion, and a third flared portion, and wherein the two stem portions comprises a first stem portion positioned between the first and second flared portions and a second stem portion positioned between the second and third flared portions, the second flared portion comprising a width that is greater than widths of the first and third flared portions. In some embodiments, the additional upright gradually transitions from the widths of the plurality of flared portions to the width of the one or more stem portions.

In some embodiments, the first beam comprises at least one bend between the first and second ends of the first beam and the second beam comprises at least one bend between the first and second ends of the second beam. In some embodiments, the first beam comprises two bends between the first and second ends of the first beam and the second beam comprises two bends between the first and second ends of the second beam. In some embodiments, the central beam does not have any bends between the first and second ends of the central beam.

In some embodiments, the plurality of cross-members comprises a first cross-member having a first length, a second cross-member having a second length, and a third cross-member having a third length, and wherein the first, second, and third lengths are equal. In some embodiments, the first upright is further configured to rotatably secure the vehicle tailgate enclosure to the portion of the first sidewall of the vehicle and the second upright is further configured to rotatably secure the vehicle tailgate enclosure to the portion of the second sidewall of the vehicle. In some embodiments, the first beam, the second beam, and the central beam are tubular.

In some aspects of the disclosure, a vehicle tailgate enclosure for use with a vehicle comprises: a plurality of cross-members and a first upright. Each of the plurality of cross-members can be vertically spaced apart from an adjacent one of the plurality of cross-members. Each of the plurality of cross-members can comprise: a first beam having a first end and a second end opposite the first end; a second beam having a first end and a second end opposite the first end; and a central beam having a first end and a second end opposite the first end, the central beam positioned at least partially between the first and second beams. The first upright can be positioned along the central beam of each of the plurality of cross-members between the first and second ends of the central beam. The first upright can be configured to secure the first and second beams to the central beam. The first upright can be the only upright positioned along the central beam of each of the plurality of cross-members between the first and second ends of the central beam.

In some embodiments, the vehicle tailgate enclosure further comprises: a second upright configured to receive the first end of the first beam of each of the plurality of cross-members, the second upright further configured to at least partially secure the vehicle tailgate enclosure to a portion of a first sidewall of the vehicle; and a third upright configured to receive the first end of the second beam of each of the plurality of cross-members, the third upright further configured to at least partially secure the vehicle tailgate enclosure to a portion of a second sidewall of the vehicle. In some embodiments, the vehicle tailgate enclosure does not include any uprights in addition to the first, second, and third upright. In some embodiments, the first upright is positioned along the central beam of each of the plurality of cross-members equidistant from the second and third uprights.

In some embodiments, the first upright comprises a plurality of channels vertically spaced from one another, each of the plurality of channels configured to receive and secure the second ends of the first and second beams to the first and second ends of the central beam. In some embodiments: the first upright comprises a plurality of flared portions and one or more stem portions, each of the plurality of flared portions including one of the plurality of channels; each of the plurality of flared portions is separated from an adjacent one of the plurality of flared portions by one of the one or more stem portions; and widths of the plurality of flared portions are greater than a width of the one or more stem portions, the widths of the plurality of flared portions and width of the one or more stem portions extending in a direction parallel to a length of the central beam.

In some embodiments: the plurality of cross-members comprises three cross-members, the plurality of channels comprises three channels, the plurality of flared portions comprises three flared portions, and the one or more stem portions comprises two stem portions; the three flared portions comprises a first flared portion, a second flared portion, and a third flared portion; and the two stem portions comprises a first stem portion positioned between the first and second flared portions and a second stem portion positioned between the second and third flared portions, the second flared portion comprising a width that is greater than widths of the first and third flared portions. In some embodiments, the first upright gradually transitions from the widths of the plurality of flared portions to the width of the one or more stem portions.

One embodiment of the present invention is an improved tailgate enclosure which preferably incorporates the use of non-circular cross-members, simplified vertical supports, and a modified storage space defined by the tailgate enclosure. In some embodiments, the new tailgate enclosure is particularly well suited for transporting motorcycles in the cargo bed of a pickup truck. The new tailgate enclosure can also desirably provide simplified assembly.

In some embodiments, a vehicle tailgate enclosure for use with a vehicle having an open storage bed is provided. The open storage bed has a rear end, a first upstanding side panel to on one side of said bed, a second upstanding side panel to on an opposite side of said bed, and a tailgate. The tailgate enclosure is mountable in a first position in which said tailgate enclosure comprises a first side wall, a second side wall, and a connecting wall. The first side wall is coupled to the first side panel. The second side wall is coupled to the second side panel. The connecting wall connects said first side wall and said second side wall, a portion of said connecting wall positioned over said tailgate rearward of said rear end of said bed, said connecting wall angling upward and outward from said tailgate at an angle of between about 10 and about 50 degrees from vertical.

In other embodiments, a vehicle tailgate enclosure for use with a vehicle having an open storage bed is disclosed. The storage bed has a rear end, a first upstanding side panel defining one side of said bed, a second upstanding side panel defining an opposite side of said bed, and a tailgate. The tailgate enclosure is mountable in a first position in which said tailgate enclosure comprises a first side wall, a second side wall, and a connecting wall. The first side wall is coupled to the first side panel. The second side wall is coupled to the second side panel. The connecting wall connects said first side wall and said second side wall. The connecting wall comprises a plurality of cross-members having a non-circular cross-section; and a plurality of struts, each strut defining a plurality of openings, each of said plurality of openings sized and shaped to receive and retain one of said plurality of cross-members.

BRIEF DESCRIPTION OF THE DRAWINGS

These and other features, aspects and advantages of the present vehicle cargo tailgate enclosure are described below with reference to drawings of preferred embodiments, which are intended to illustrate, but not to limit, the present invention. The drawings contain twenty-three figures.

FIG. 11 is a partial cross-sectional view of a truck with the truck tailgate enclosure of FIG. 1 behind the truck cab.

FIG. 12 is a cross-sectional view of a tubular member of the truck tailgate enclosure of FIG. 1.

FIG. 27 is a rear view of the truck tailgate enclosure of FIG. 24.

FIG. 28 is a front view of the truck tailgate enclosure of FIG. 24.

DETAILED DESCRIPTION OF THE PREFERRED EMBODIMENT

Several embodiments of vehicle cargo tailgate enclosures are described herein. With reference to many of the figures, relative directions and positions are used such as top, bottom, front, back, left, and right. With reference to the tailgate enclosure, the direction convention follows corresponding to a vehicle with the tailgate enclosure in the position shown in FIG. 1. That is, the left side of the cargo tailgate enclosure corresponds to the left side of the vehicle and the top of the tailgate enclosure corresponds to the top of the vehicle all from the orientation of a person sitting in the driver's seat. This direction convention will be carried with the tailgate enclosure throughout different positions which may shift the relative front, back, top, and bottom of the tailgate enclosure relative to the vehicle. This direction convention is only intended to clarify the description and is in no way intended to limit the scope of the technology, unless otherwise expressly stated.

Figure 1:
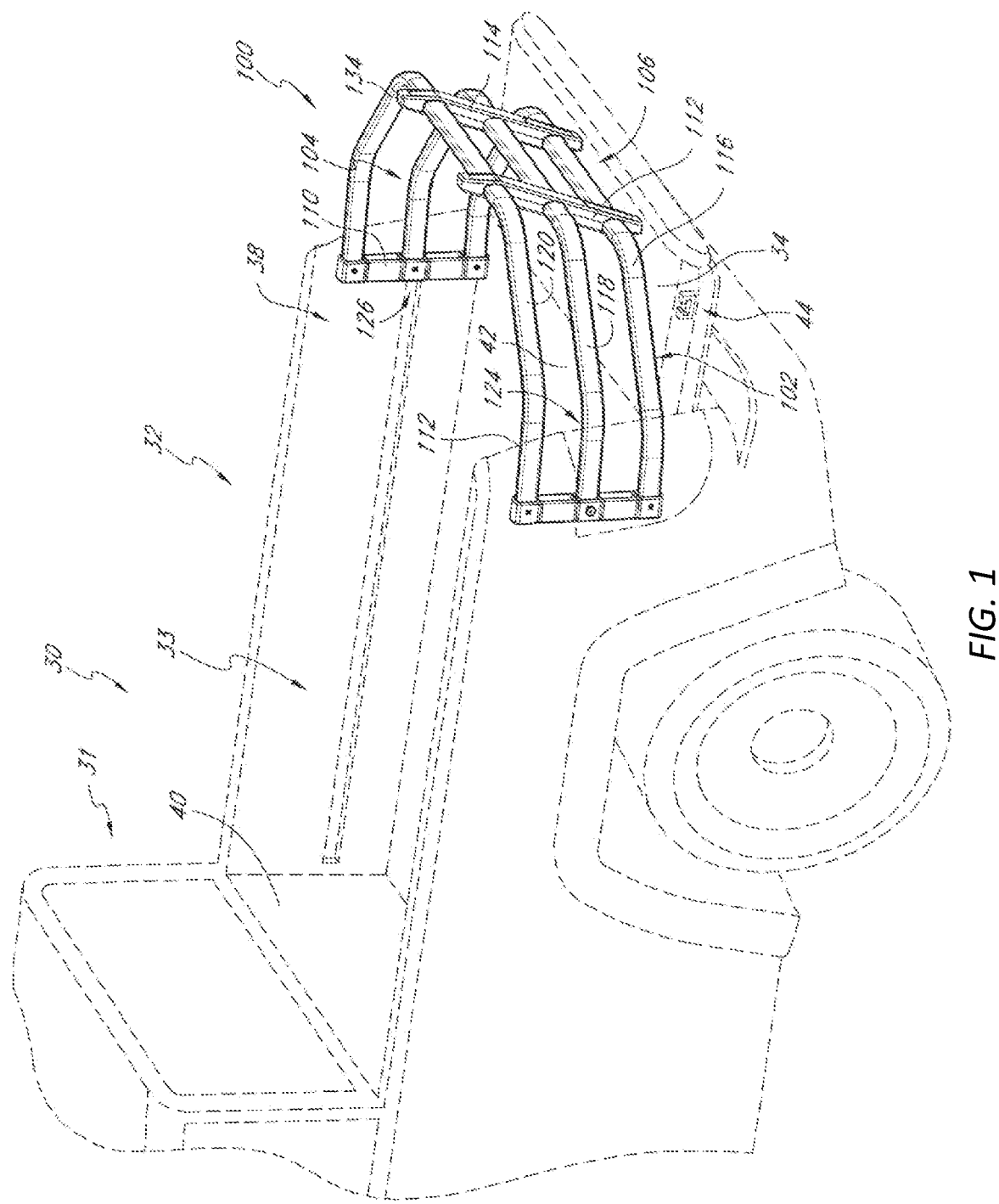
FIG. 1 is a perspective view of an embodiment of a truck tailgate enclosure mounted on a truck over the tailgate.
Figure 2:
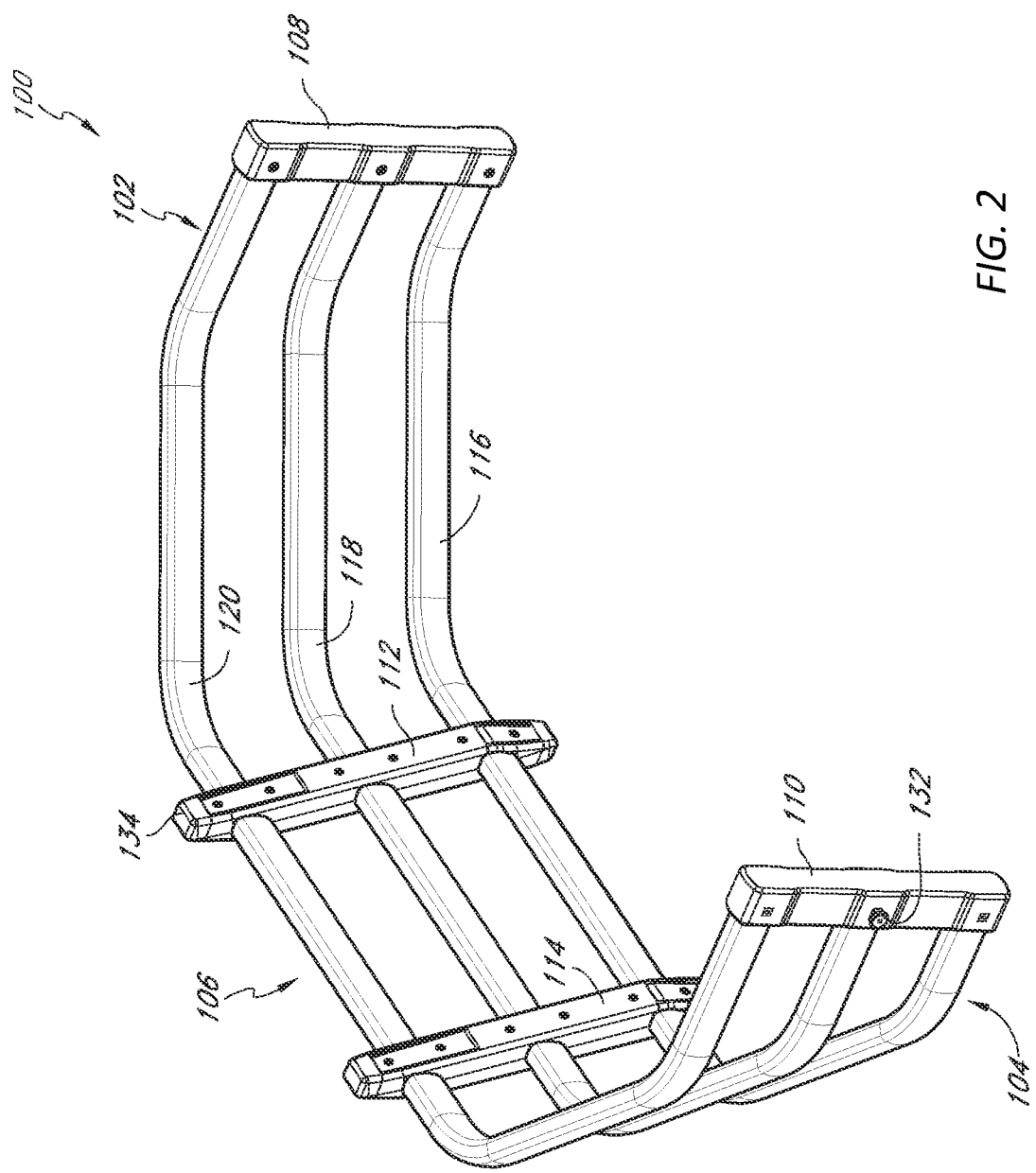
FIG. 2 is a perspective view of the truck tailgate enclosure of FIG. 1.

FIG. 1 illustrates a cargo tailgate enclosure 100 mounted to a truck 30. The truck 30 comprises a cab 31 to the rear of which is a cargo bed 32. The cargo bed 32 includes a front wall 40, right side wall 36, left side wall 38, and a tailgate 34 which together define a cargo space 33. The cargo tailgate enclosure 100 is preferably mounted to the right side wall 36 and the left side wall 38 and, in certain positions, is capable of increasing the cargo space 33 or partitioning the cargo space 33. The walls 36, 38, 40, and the tailgate 34 are desirably upstanding panels which define a generally rectangular cargo space 33 which can be open from above.

With reference to FIG. 1, the tailgate 34 is capable of providing access to the cargo space 33 from a rearward location and is pivotally connected adjacent a lower surface 42 of the cargo bed 32 that defines a lower end of the cargo space 33. In other trucks to which the tailgate enclosure 100 can be applied, the tailgate 34 can be configured to be pivotally connected to the right side wall 36 or the left side wall 38. The tailgate 34 can further comprise a latch mechanism 44 configured to secure the tailgate in a closed and upright position. In the position shown in FIG. 1, the cargo tailgate enclosure 100 is extends the cargo space 33 of the cargo bed 32 when the tailgate 34 is in an open position.

With reference to FIG. 1, in its deployed position, the cargo tailgate enclosure 100 may comprise a generally U shape which, in the position illustrated in FIG. 1, is open towards the front of the truck 30. Referring to FIGS. 1-9, the cargo tailgate enclosure further comprises a left side wall 102, a right side wall 104, and a connecting wall 106. In the position illustrated in FIG. 1, the left side wall 102 extends rearward from the left side wall 36 of the truck 30 and the right side wall 104 extends rearward from the right side wall 38 of the truck 30. The connecting wall 106 can connect rearward portions of the side wall 102 and the side wall 104 and to at least partially enclose the cargo space 33 of the truck 30. The cargo tailgate enclosure 100 is desirably pivotally connected to the left side wall 36 and the right side wall 38 of the truck 30 at pivot connection 124 and pivot connection 126. The cargo tailgate enclosure 100 can be rotated about the pivot connections 124, 126. The pivotal nature of the connections 124, 126 different configurations in which the cargo tailgate enclosure 100 can be positioned without disconnecting the cargo tailgate enclosure 100 from the side wall 36 and the side wall 38 and will be discussed in greater detail below. As will be appreciated, non-pivoting connections are also possible.

With continued reference to FIGS. 1-8, the cargo tailgate enclosure can further comprise three cross-members or tubular members including a bottom cross-member or tubular member 116, a middle cross-member or tubular member 118 and a top cross-member or tubular member 120 which at least partially form the walls 102, 104, and 106. The tailgate enclosure 100 may also comprise four vertical upright members or struts including a left pivot upright or strut 108, right pivot upright or strut 110, right rear upright or strut 112 and left rear upright or strut 114. The uprights 108, 110, 112, and 114 may be configured to secure the cross-members or tubular members 116, 118, and 120 in an evenly spaced configuration. The spacing between the cross-members or tubular members 116, 118, and 120 is preferably configured so that the height of walls 102, 104, and 106 of the cargo tailgate enclosure 100 is similar to the depth of the cargo space 33 of the truck 30.

The tubular members 116, 118, and 120 can desirably be made of a metallic material such as 6061-T6 Aluminum or stainless steel and the uprights can desirably be made of a high strength plastic material. Although the above mentioned materials can desirably be used, other such materials can be used in other embodiments of tailgate enclosure. For example, the tubular members 116, 118, and 120 can be made of plastic or metallic materials and the uprights 108, 110, 112, and 114 can be made of billet aluminum or a composite such as carbon fiber. As and alternate to tubular members, cross-members formed of solid or hollow shapes include such shapes as solid L-angles, L-shaped tubing, I-beams, I-shaped tubing, octagonal tubing, round tubing, square solid bars, square tubing, triangular solid bars, triangular tubing or other suitable shapes. Furthermore, the tubular members 116, 118, and 120 can be made of any suitable material such as plastic, composites, steel, or aluminum.

Although the embodiment of the cargo tailgate enclosure 100 shown in FIGS. 1-8 has been illustrated with three tubular members 116, 118, and 120, any number of tubular members may be used in the cargo tailgate enclosure 100. For example a tailgate enclosure 100 may include 2, 4, or 5 tubular members. Because a tailgate enclosure with a greater number of tubular members may in turn have a smaller spacing between the bars, it may be useful for carrying cargo that is relatively small and may be at risk of slipping between the tubular members. The same applies to the vertical uprights in that any number or spacing of vertical uprights may be used with the cargo tailgate enclosure 100. Once again a greater number of vertical uprights can be desirable depending on the preferred cargo to be carried.

One advantage of the spacing of the tubular members 116, 118, and 120 is that it provides passageways for air to pass through the walls 102, 104 and 106 of the cargo tailgate enclosure 100. Quite often when a vehicle, such as the truck 30 of FIG. 1, is traveling at high speeds the tailgate 34 can provide a great deal of wind resistance when in an upright positions. With the spaced positioning of the tubular members 116, 118, and 120 shown in FIGS. 1-8 air may pass freely through cargo tailgate enclosure 100, which reduces unnecessary wind drag on the truck 30.

Figure 8:
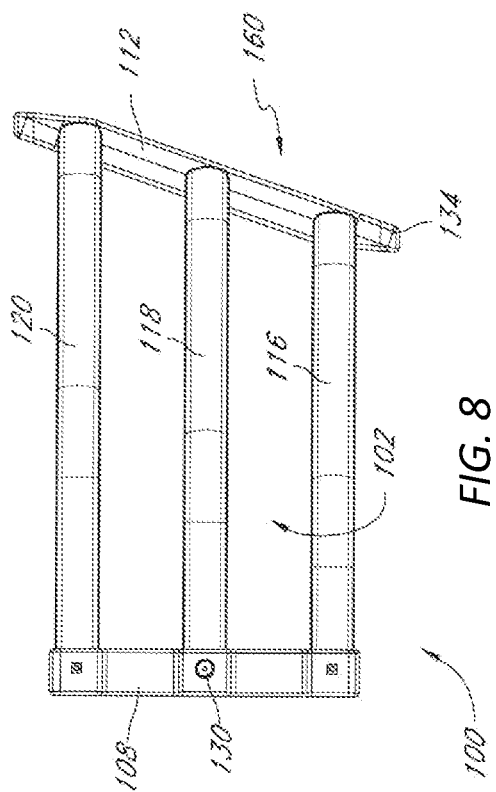
FIG. 8 is a left side view of the truck tailgate enclosure of FIG. 1.
Figure 7:
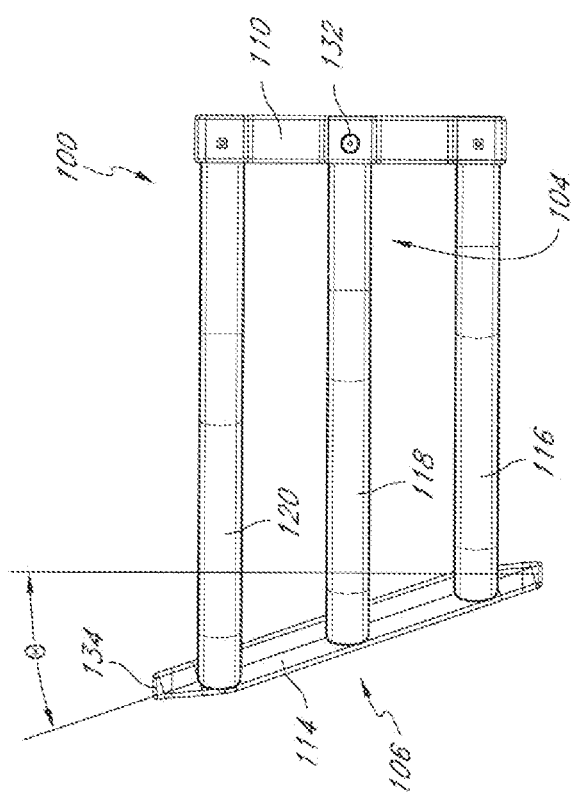
FIG. 7 is a right side view of the truck tailgate enclosure of FIG. 1.

With reference to FIGS. 7 and 8, the cargo tailgate enclosure further comprises a rearwardly sloping back wall 106. The back wall 106 is configured to slope upward and outward relative to a rear end of the tailgate 34. The rearward angle θ of the back wall 106 from vertical is preferably at least 10 degrees and desirably at least 15 degrees. In one embodiment, the angle, θ is approximately 19.1 degrees. Furthermore, the angle θ of the back wall 106 can preferably be no greater than about 50 degrees and desirably no greater than 45 degrees and more preferably no greater than 30 degrees. Furthermore the range of the angle θ in some embodiments is desirably between 10 degrees and 50 degrees and preferably between 15 degrees and 45 degrees and more desirably between 15 degrees and 30 degrees. The benefits and advantages of the sloped back wall 106 will be discussed in further detail below with reference to various positions of the tailgate enclosure 100.

Figure 5:
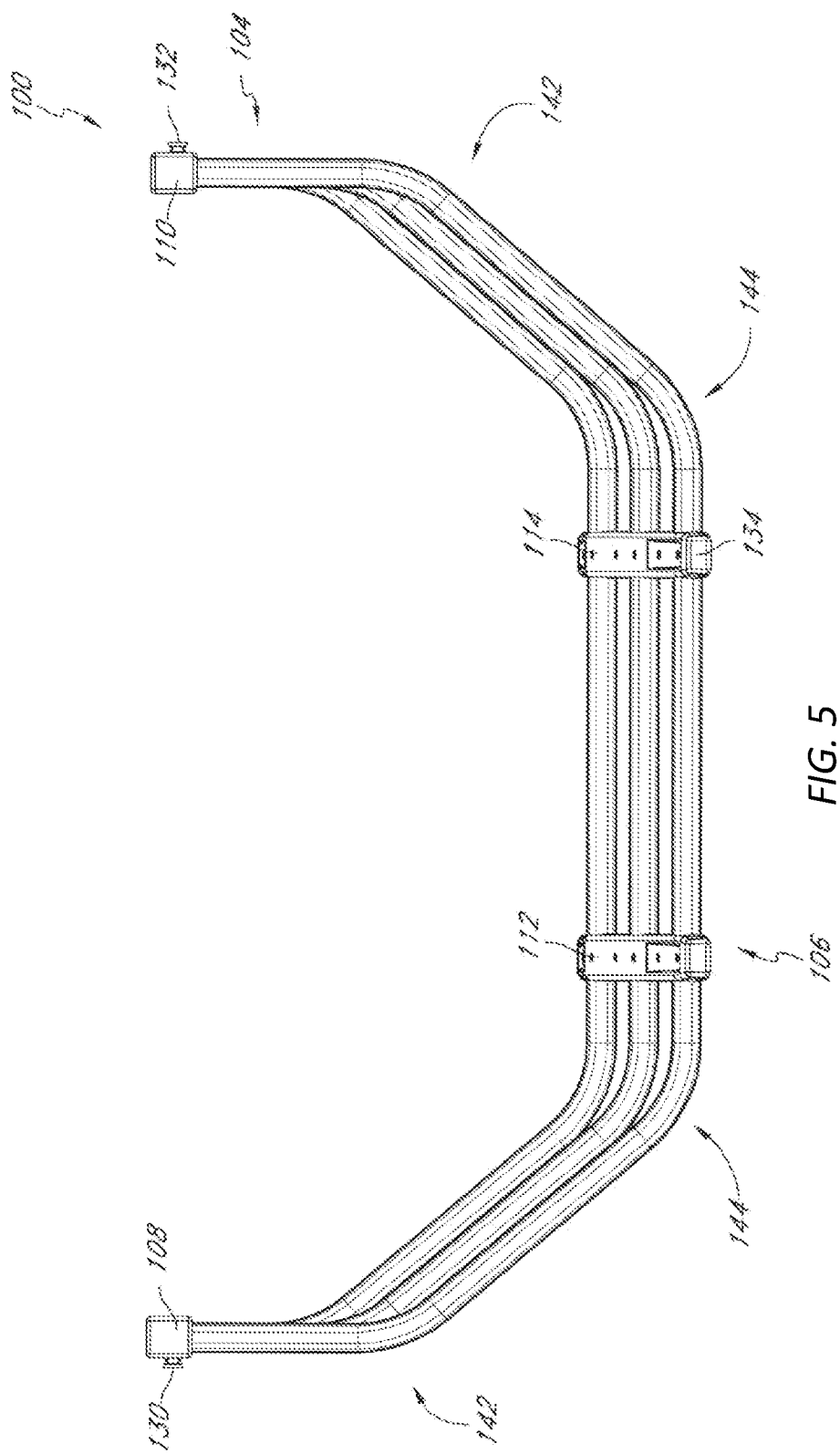
FIG. 5 is a top view of the truck tailgate enclosure of FIG. 1.
Figure 6:
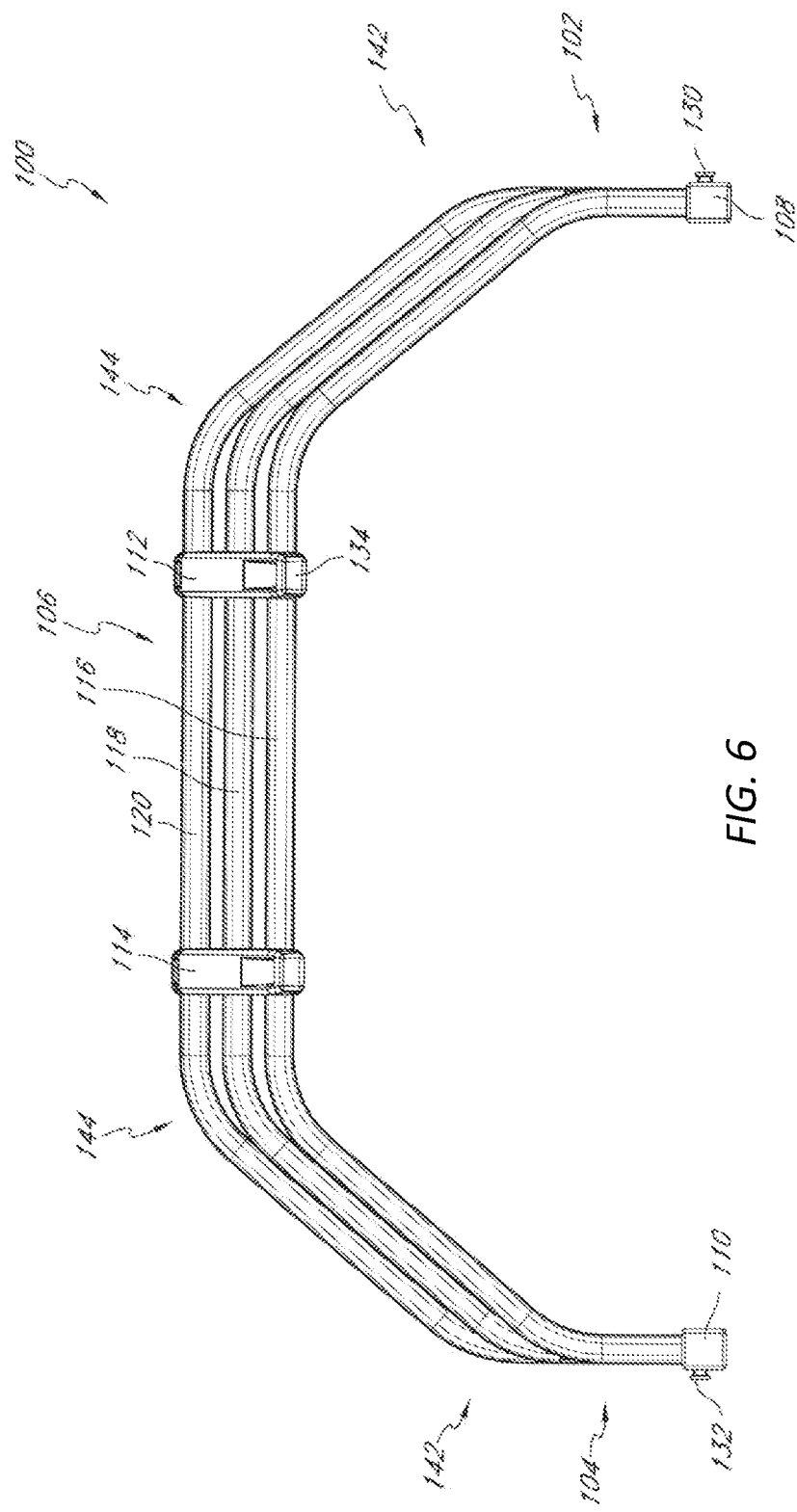
FIG. 6 is a bottom view of the truck tailgate enclosure of FIG. 1.

With reference to FIGS. 5 and 6, the walls 102, 104, and 106 are preferably formed at least in part by the tubular members 116, 118, and 120. In order to transition between the side walls 102 and 104 to the back wall 106, the tubular members 116, 118, and 120 can be bent to achieve the transitions. In one embodiment, the tubular members 116, 118, and 120 can have two bend locations on each side of the cargo tailgate enclosure 100 including two forward bent transitions 142 and two rearward bent transitions 144. Although the illustrated embodiment shows two bent transitions 142 and 144 any number of bent transitions may be used including one or three. As used herein, "bent" is a broad term, and is in reference to the end configuration, not the manufacturing process. Thus, a carbon fiber tubular member that is laid up originally with a bend in it would be considered bent.

In some embodiments, the tubular members 116, 118, and 120 are formed of multiple pieces such that the tubular members 116, 118, and 120 are formed of two L-shaped pieces which can connect along the back wall 106. Such a configuration can reduce the size of the tubular members 116, 118, and 120, which may increase the ease of shipping and/or storing the cargo tailgate enclosure 100. Furthermore, because the tubular members 116, 118, and 120 are preferably made of two L-shaped pieces, the tubular members 116, 118, and 120 can provide a degree of adjustment to adjust the overall width of the cargo tailgate enclosure 100. Such an adjustment can be advantageous to accommodate for dimensional tolerances in various vehicles or in the cargo tailgate enclosure 100. Although the embodiment of the tailgate enclosure shown in FIGS. 1-8 has been shown with the tubular members 116, 118, and 120 comprising two L-shaped pieces, the tubular members 116, 118, and 120 can comprise any number of pieces including being formed of one solid piece.

With continued reference to FIGS. 1-8, the left upright 108 and the right upright 110 may be configured to substantially cap open distal ends of the tubular members 116, 118, and 120. The right upright 110 and the left upright 108 are further configured to include a left pivot mount 130 and a pivot mount 132 which are configured to secure the cargo tailgate enclosure 100 to the left side wall 36 and the right side wall 38 of the truck 30. Preferably, the left pivotal mount 130 and the right pivotal mount 132 are received by latches 202, illustrated in FIGS. 17-20 which may be mounted to an inner surface of the side wall 36 and 38. The details of the connection between the pivotal mounts 130 and 132 and the latches 202 will be discussed in greater detail below.

With continued reference to FIGS. 1-8, in some embodiments, the left rear upright 112 and the right rear upright 114 can comprise bumpers 134. The bumpers 134 are configured to support the back wall 106 of the cargo tailgate enclosure 100 when the cargo tailgate enclosure is rested against the lower surface 42 of the cargo bed 32 or the tailgate 34. The bumpers 134 are desirably made of a rubber material so as to provide a soft interface between the right rear upright 114 and the left rear upright 112 and the bottom surface 42 of the cargo bed 32 or the tailgate 34.

Figure 9:
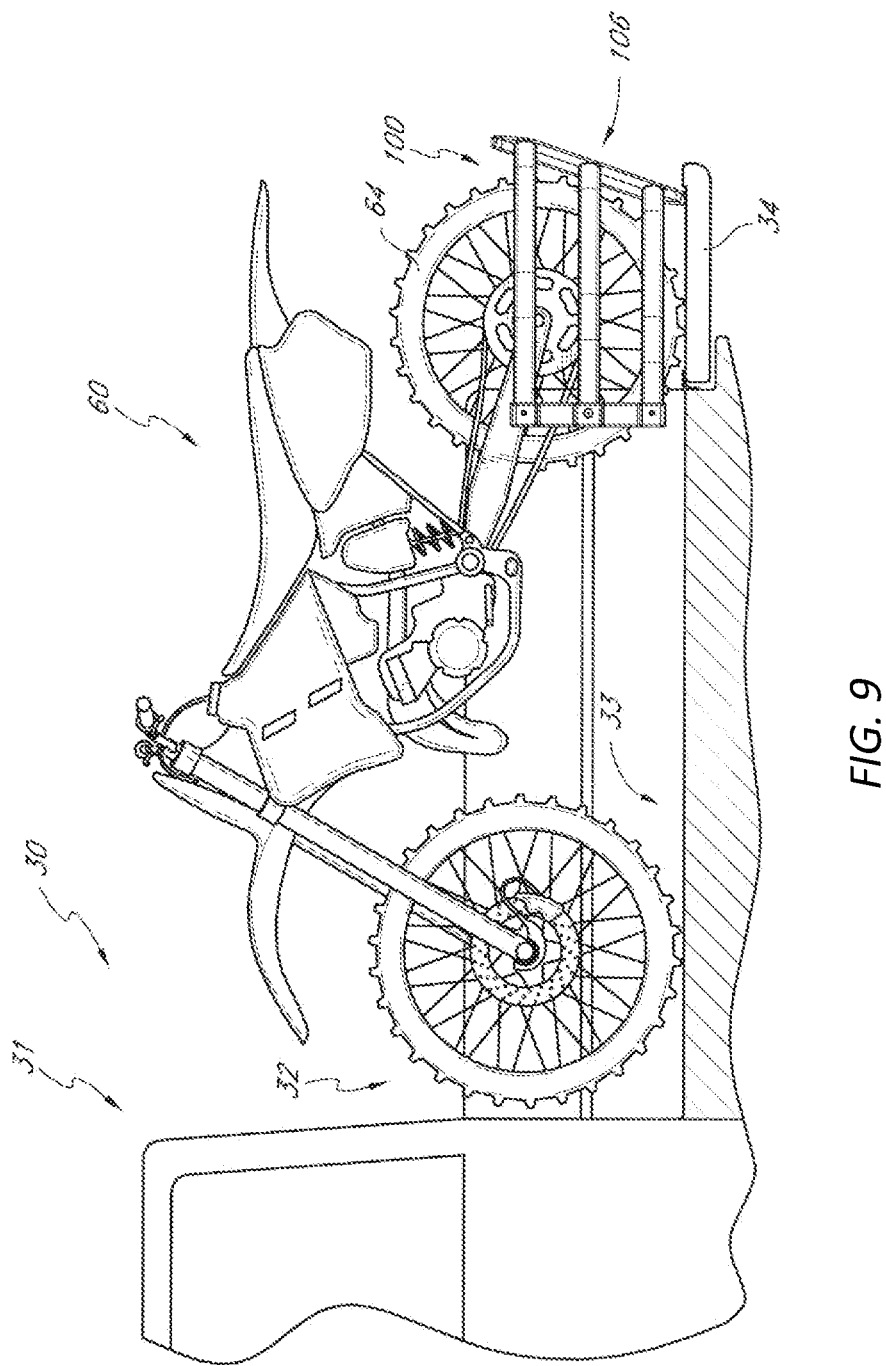
FIG. 9 is a partial cross-sectional view of a truck with the tailgate enclosure of FIG. 1 over the tailgate.

FIG. 9 illustrates the cargo tailgate enclosure 100 arranged in a first position in which the cargo tailgate enclosure 100 extends upward and outward away from the tailgate 34 and increases the size of the cargo space 33. In this configuration, the cargo tailgate enclosure 100 provides more space for storage and transport of items, such as the motorcycle 60 illustrated in FIG. 9. In the configuration shown in FIG. 9, the sloping back wall 106 of the cargo tailgate enclosure 100 provides an advantage when transporting the motorcycle 60 in that it can provide additional space for a rear wheel 64 of the motorcycle 60 while still maintaining at least a portion of the rear wall 106 resting on the tailgate 34. This configuration is afforded by the angle of the rear wall 106 and the configuration of the rear uprights 112, and 114 which maintain the bumpers 134 in a position resting on the tailgate 34. While the illustrated configuration shows certain advantages of the tailgate enclosure 100 for transporting a motorcycle 60, it is contemplated that the additional cargo space can also be beneficial in transporting other items such as other wheeled vehicles (e.g. bicycles, all-terrain vehicles, scooters), or other cargo that would otherwise extend past the vehicle's open tailgate 34.

In certain scenarios when it is desirable to transport a motorcycle 60 in the cargo bed 32 of the truck 30, a cargo tailgate enclosure with a substantially vertical rear wall may not provide sufficient space to transport the motorcycle 60 because the rear wheel 64 may extend past a distal end of the tailgate 34. Thus, by using the cargo tailgate enclosure 100 with the sloped rear wall 106, transport and storage of the motorcycle 60 is easy and convenient.

It must also be noted that if a cargo tailgate enclosure with a vertical rear wall were to be used in a situation as illustrated in FIG. 9 the cargo space 33 would be compromised in order to provide sufficient space for an item such as the motorcycle 60. That is, if a cargo tailgate enclosure with a vertical rear wall were to be made with side walls long enough to enclose the rear wheel 64 of the motorcycle 60, a hole would be defined by the rear wall of the tailgate enclosure and a distal end of the tailgate 34 which may allow cargo to fall out of the cargo space 33. Thus, by using a sloped rear wall 106 the cargo tailgate enclosure 100 can accommodate long items such as the motorcycle 60 and still substantially enclose the cargo space 33. Although a motorcycle has been used as an example of a cargo item that extends past a distal end of an open tailgate 34, as noted above the tailgate enclosure 100 can be useful with any large, or long, cargo item.

Figure 10:
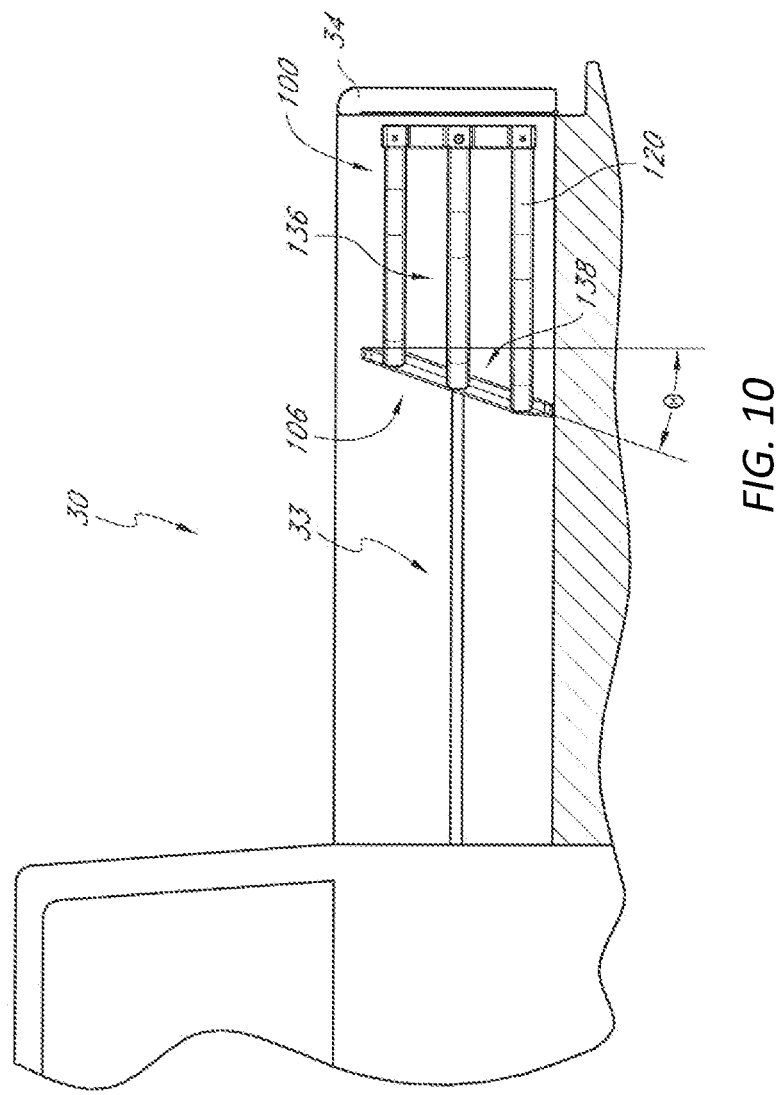
FIG. 10 is a partial cross-sectional view of a truck with the tailgate enclosure of FIG. 1 spaced forward of the closed tailgate.

FIG. 10 illustrates a second position of the cargo tailgate enclosure 100. In the position illustrated in FIG. 10, the cargo tailgate enclosure is positioned so that the tubular member 120 is closest to a lower surface 42 of the cargo bed 32. The cargo tailgate enclosure 100 is connected to the right side wall 36 and the left side wall 38 of the cargo bed 32 at the pivot connection 124 and pivotal connection 126 (FIG. 1) at a location similar to that shown in FIG. 9. In the position shown in FIG. 10, the tailgate 34 can be in an upright and closed position, and the cargo tailgate enclosure 100 can provide a storage space 136 within the cargo space 33 that is smaller than the storage space provided by the cargo bed 32. Thus, in this second position, the cargo tailgate enclosure 100 can provide a partition in the cargo space 33. The position shown in FIG. 10 can be achieved by either rotating the cargo tailgate enclosure 100 about the pivot connections 126 and 124 from the position shown in FIG. 9 or by mounting the cargo tailgate enclosure 100 directly in the position shown in FIG. 10.

The cargo space 136 provided by the cargo tailgate enclosure 100 in the second position may be advantageous when it is desirable to transport small to medium sized items. The cargo tailgate enclosure 100 can desirably provide security to transport such small and medium sized items in that it will substantially reduce the likelihood of the items shifting throughout the entirety of the cargo space 33 during transport. The sloped rear wall 106 of the cargo tailgate enclosure further provides a subspace 138 of the cargo space 136 that is particularly well suited for storing small items because the sloped rear wall 106 provides some added security by covering the upper portion of the subspace 136. Such a space may be useful when transporting groceries or a duffle bag because a user could tuck such items into the subspace 138.

FIG. 11 illustrates a third position of the cargo tailgate enclosure 100 in which the cargo tailgate enclosure 100 is located near the front wall 40 of the cargo bed 32. The cargo tailgate enclosure 100 is positioned so that the tube 116 is located closest to the lower surface 42 of the cargo bed 32, and the uprights 108 and 110 are located closest to the front wall 40 of the cargo bed 32. In some pick-up trucks, the cargo bed 32 can include a storage box 46 located below the lower surface 42 of the cargo bed 32 which is closed by a lid 48. The lid 48 is preferably pivotally connected to the lower surface 42 of the cargo bed 32. The sloped rear wall 106 of the cargo tailgate enclosure 100 is advantageous in this position in that it can allow the lid 48 to be opened while the cargo tailgate enclosure 100 is in the third position. In the position shown in FIG. 11, the left upright 112 and the right upright 114 (FIG. 1) rest against the lower surface 42 of the cargo bed 32 at a position in front of the pivot end of the lid 48. Thus, the cargo tailgate enclosure 100 can allow the lid 48 to be opened provide access to the storage box 46 without repositioning or removing the cargo tailgate enclosure 100. One such storage box 46 and lid 48 configuration can be seen on a Honda Ridgeline™ truck.

FIG. 12 illustrates a cross-section of the tubular member 116, 118, and 120. The cross-section comprises a generally non-circular shape with curved end walls 121 and sidewalls 119. In the embodiment shown in FIG. 12 the average height AH of the cross-section is preferably 1.92 inches and the average width AW is preferably 1.18 inches. Furthermore, in the embodiment shown in FIG. 12 the overall Height H is preferably 2 inches and the overall width W is preferably 1.375 inches. Although this particular embodiment comprises the aforementioned dimensions, other suitable dimensions can be used. When the average height AH is 1.92 inches and the average width AW is 1.18 inches, the resultant average height to average width ratio is 1.62, which approximates a ratio commonly referred to as Fibonacci's Golden Ratio. This proportion provides an aesthetically pleasing shape to the tubular members 116, 118, and 120.

With continued reference to FIG. 12 the tubular members 116, 118, and 120 comprise a non-circular profile. In the illustrated embodiment, the tubular members 116, 118, 120 further include convex curved sides having sidewalls 119 extending generally vertically to define a height H of the tubular members 116, 118, 120 and end walls 121 extending generally horizontally to define a width W of the tubular members 116, 118, 120. The sidewalls 119 preferably comprise a radius R1 such that the ratio of the radius R1 to the height H is preferably less than 3:1. Furthermore, the ratio of the radius R1 to the height H is desirably less than 2:1, and preferably less than 1.5:1, being more preferably less than 1.15:1. In the particular embodiment shown in FIG. 12 the ratio is approximately 1.110:1. The radius R2 of the end walls 121 also comprise substantially similar ratio, however with regard to the end walls 121 the ratio of the radius R2 is compared to the width W. That is, the ratio of the radius R2 to the width W is preferably less than 3:1, and desirably less than 1.5:1, being more desirably less than 1.15:1. In the particular embodiment shown in FIG. 12 the ratio is 1.117:1.

With continued reference to FIG. 12 the curved corners 123 preferably comprise a radius R3 such that a ratio between the radius R3 and the height H is preferably greater than 1:32. Furthermore the ratio between radius R3 and the height H is preferably greater than 1:16 and desirably greater than 1:6. In the particular embodiment shown in FIG. 12 the ratio is 3:16. Although this particular embodiment comprises the aforementioned dimensions, other suitable dimensions can be used. It is however preferable to maintain the non circular cross section of the tubular members 116, 118, and 120 without creating a flat walled cross section. In the embodiment shown in FIG. 12 the radius R3 is preferably greater than ⅛ inch and desirably greater than ¼ inch. In the embodiment shown the radius R3 is ⅜ inch. Once again although specific dimensions are described above other suitable dimensions may be used.

Although the embodiment of the cargo tailgate enclosure 100 is described with cross-members or tubular members 116, 118, and 120 comprising the particular cross section shown in FIG. 12, in certain other embodiments other non-circular shapes may be used. Such alternate non-circular shapes may include, square, triangular, octagonal, or any other suitable non-circular shapes. Furthermore, the cross-members 116, 118, and 120 can, in some embodiments, comprise a solid shape. Some alternative shapes may include solid L-angle, solid I-beam, solid square shapes, or any other suitable solid or hollow shapes.

With continued reference to FIG. 12, an advantage of the cross-section shown in FIG. 12 is that when the cargo tailgate enclosure 100 is to be grasped by a user, the cross-section of the tube provides an excellent gripping shape so as to manipulate the cargo tailgate enclosure 100. This is particularly advantageous over a cylindrical tube in that less force is required to grasp the tube to prevent rotation within one's hand. Such a configuration in which the shape of the tubular members 116, 118, and 120 may be particularly useful is that shown in FIG. 18. When the tailgate enclosure is to be attached to the truck 30 from a position in which the tailgate enclosure 100 is in a generally horizontal position, the non-circular shape of the tubular members 116, 118, and 120 can provide an excellent grasping surface in which the tailgate enclosure 100 can be manipulated. That is, that shape of the tubular members 116, 118, and 120 allows the user to easily handle the tailgate enclosure 100 without the tubular members 116, 118, and 120 twisting in ones hands.

As discussed above with reference to FIG. 5, in some embodiments, the cargo tailgate enclosure 100 can include two sets of bent transitions: a forward set of bent transitions 142, and a rearward set of bent transitions 144. The bent transitions 142, 144 are configured to transition the side walls 102 and 104 into the rear wall 106 of the cargo tailgate enclosure 100. In the illustrated embodiment, it is desirable to bend the tubular members 116, 118, and 120 in order to achieve the angled transition 142 and 144. Thus, an advantage of the cross section of the tubular members 116, 118, and 120 is that the shape described above with respect to FIG. 12 can bend to accommodate the bends 142, 144 of the cargo enclosure 100 without substantially buckling the tubular members 116, 118, 120. If the tubular members 116, 118, and 120 were to be made with a sharp rectangular cross section, the bending of the tubular member could possibly result in bucking or dimpling of the tubular members 116, 118, and 120. Thus, the cross sectional shape of the tubular member 116, 118, and 120 illustrated in FIG. 12 provides a smooth bend when the tubular member 116, 118, and 120 are to be bent to form the angled transitions 142 and 144.

With continued reference to FIG. 12, another advantage of the non-circular tubular members 116, 118, and 120 is that the tubular members 116, 118, and 120 can be rotationally secured in the uprights 108, 110, 112 and 114. As further discussed below, the uprights 108, 110, 112 and 114 can include receiving recesses shaped to receive the non-circular tubular members 116, 118, 120 such that the tubular members are substantially restrained from rotating. This restraining feature of the uprights 108, 110, 112, 114 can be particularly advantageous with a cargo enclosure 100 comprising a sloped back wall 106. Due to the sloped back wall 106, a predetermined alignment of the tubular members 116, 118, and 120 within the uprights 112 and 114 is desirable. Thus, by using non-circular tubular members 116, 118, and 120, a desired orientation of the tubular members 116, 118, and 120 within the uprights 112 and 114 can be maintained by corresponding recesses in the uprights 112 and 114. That is, the angle of formation of the recesses in the uprights 112 and 114 can dictate the angle of the uprights 112 114 relative to the tubular members 116, 118, 120.

Advantageously, the use of non-circular tubular members 116, 118, 120 the cargo enclosure 100 can reduce assembly complexity, time, equipment, and expenses. The alignment of cylindrical tubular members relative to the uprights 112 and 114 can be particularly difficult if one were to assemble the cargo tailgate enclosure 100 without the use of a special alignment jig. In assembly of a cargo enclosure 100 with cylindrical tubular members, an alignment jig would be preferably used to align the tubes before the uprights were secured to the tubular members. However, a cargo enclosure 100 including tubular members with a non-circular cross-sectional profile, the tubular members 116, 118, 120 can be secured to the uprights 112 and 114 without the use of a special jig because the shape of the tubular members 116, 118, 120 will align with recesses in the uprights 112 and 114. Thus, this self-aligning feature of a cargo enclosure 100 with non-cylindrical tubular members 116, 118, 120 can require less time and equipment to assemble.

This assembly advantage extends further to the shipping and storage of a cargo tailgate enclosure 100 having non-cylindrical tubular members 116, 118, 120. If a special jig is required to assure proper alignment of the cargo tailgate enclosure 100, then it may be necessary to assemble the cargo tailgate enclosure at a manufacturing facility and then to box the cargo tailgate enclosure in an assembled state to ship to the customer. With the present embodiment utilizing non-circular tubes 116, 118, and 120, a jig is not required and therefore the cargo tailgate enclosure 100 can be shipped to a distributor, retail location, or an end user in a partially or completely disassembled state. The distributor, retail location, or end user can then easily assemble the cargo enclosure 100 without the use of specialized tools. The shipment of an at least partially disassembled cargo enclosure 100 can require a much smaller shipment box than that used to ship a fully assembled cargo enclosure 100. Thus, the ease of assembly afforded by the tailgate enclosure 100 may substantially reduce the cost of shipping containers and handling costs.

With returning reference to FIGS. 1-8, the tubular members 116, 118, and 120 are desirably configured so that the tubes are oriented in a vertical direction. That is, the longer portion of the cross-section of each tubular member 116, 118, and 120 is desirably oriented in a vertical direction. This orientation can provide bending resistance to loads imposed in a vertical direction. This bending resistance can be particularly advantageous if cargo (e.g., lumber) is to be loaded into the cargo bed 32 which may extend beyond the back wall 106 of the cargo tailgate enclosure 100 when the tailgate enclosure 100 is in the position shown in FIG. 9. By providing the tubular members 116, 118, and 120 to be configured in a vertical direction, the load can then easily be supported by the cargo tailgate enclosure 100. Although the illustrated embodiments show the tubular members 116, 118, and 120 having the cross-section arranged so that the longer dimension is arranged in vertical direction, any rotational arrangement of the tubing may be employed. Such alternate arrangements may include the tubular members 116, 118, and 120 being arranged so that the longer dimension of the cross section is arranged horizontally or parallel to the back wall 106, or with the longer dimension oriented at an angle between vertical and horizontal.

Figure 14A:
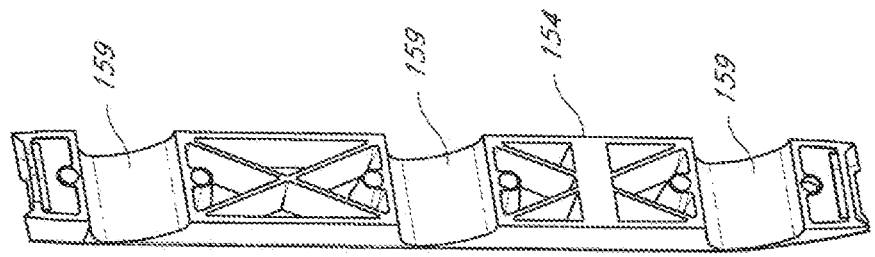
FIG. 14a is a perspective view of a mating section of a rear upright of the truck tailgate enclosure of FIG. 1.
Figure 14:
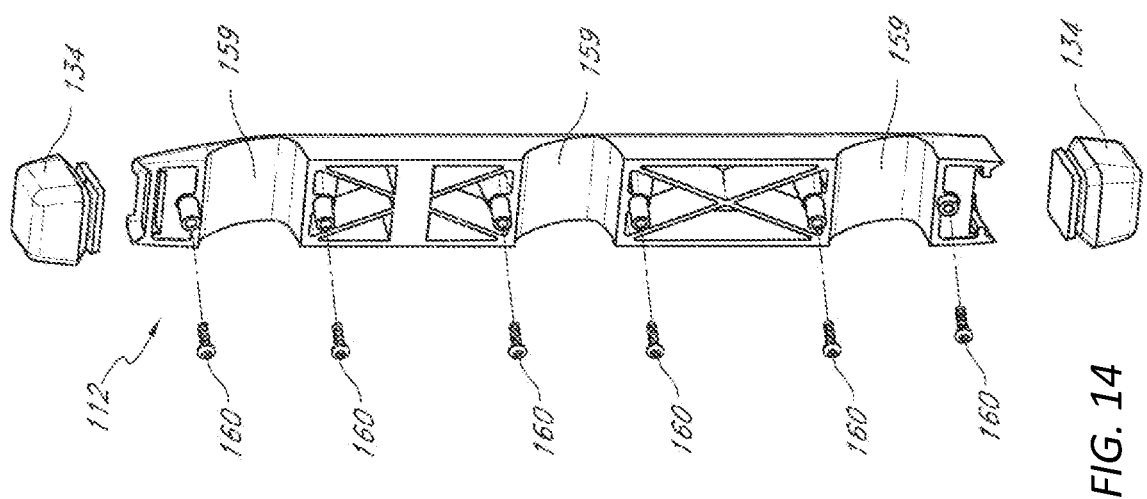
FIG. 14 is a perspective view of a section of a rear upright of the truck tailgate enclosure of FIG. 1.
Figure 13:
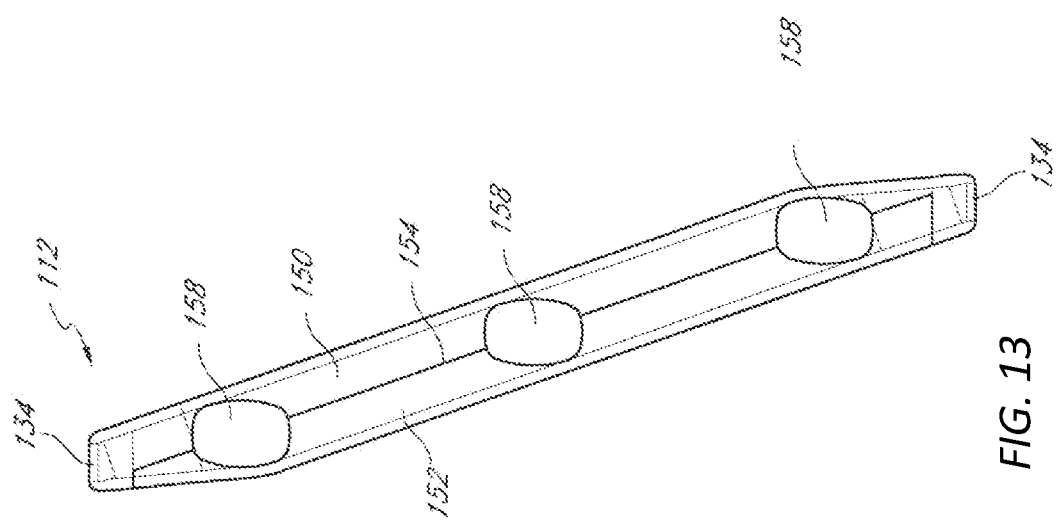
FIG. 13 is a side view of a rear upright of the truck tailgate enclosure of FIG. 1.

FIGS. 13 and 14, and 14a illustrate the left rear upright 112. In the illustrated embodiment, the left rear upright 112 is substantially similar to the right rear upright 114. The upright support 112 can be split along a split line 154 which separates the support 112 into a first shell portion 150 and a second shell portion 152. The split line 154 desirably passes diagonally through the channels 158. Preferably the split line passes through non-adjacent corners of the channel 158.

With continued reference to FIGS. 13, 14, and 14a, the left rear upright 112 can further include a bumper 134 on an upper and a lower end of the upright 112. The rubber bumpers 134 are configured to mount to the upright 112 by a tongue-and-groove arrangement. The bumper 134 can comprise a rubber material to reduce the risk of damaging the bed floor 42 or tailgate 34 when the cargo enclosure 100 is in various positions (see, e.g. FIGS. 1, 9, 10).

With continued reference to FIGS. 13, 14, and 14a, the upright 112 can further define three channels 158, each of which is configured to receive a tubular member 116, 118, 120. The first shell portion 150 and the second shell portion 152 of the support 112 are configured to separate along the split line 154 and each desirably defines a series of partial channels 159 which cooperate together to form the channels 158 to allow the tubular members 116, 118, 120 to be installed positioned in the channels 158 defined by the upright 112. In some embodiments, the first shell half 150 and the second shell half 152 are configured to be secured to one another by threaded fasteners 160 that can be received in threaded recesses in the shell halves 150, 152. As used herein "channel" is a broad term. A "full channel" may have a variety of configurations, but desirably prevents the tubular members 116, 118, 120 from moving upward, downward, frontward, and rearward.

Figure 15:
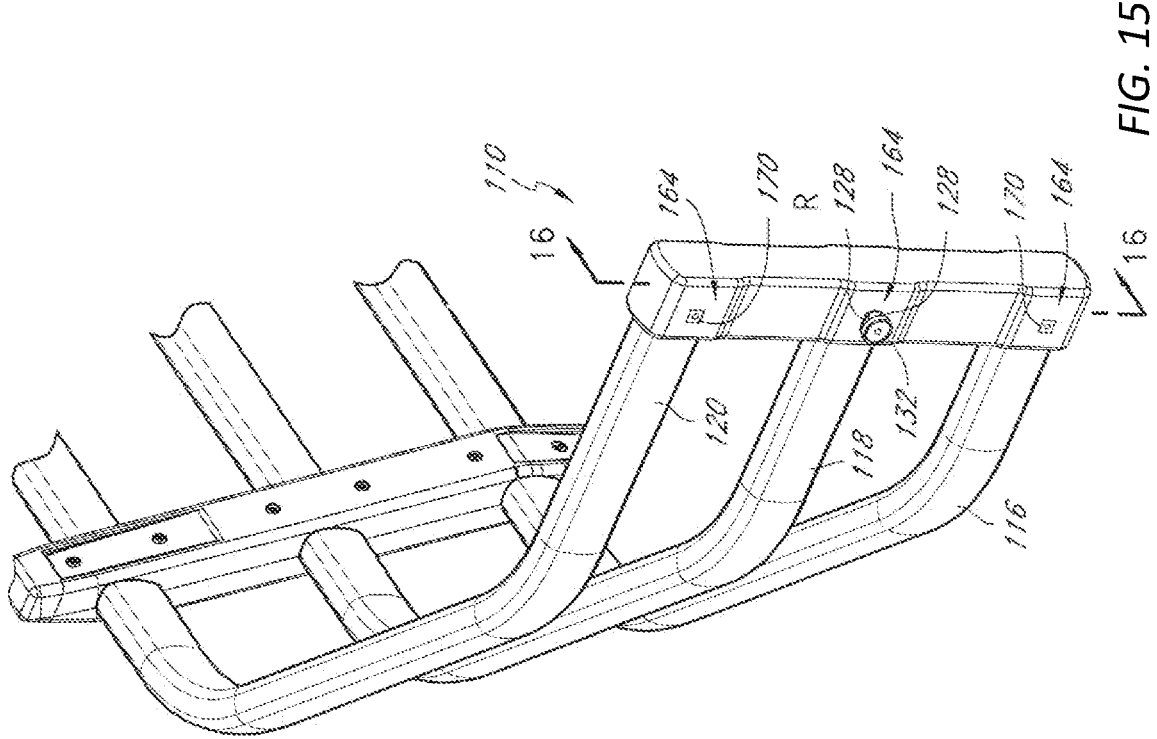
FIG. 15 is a perspective view of a pivot upright of the truck tailgate enclosure of FIG. 1.
Figure 16:
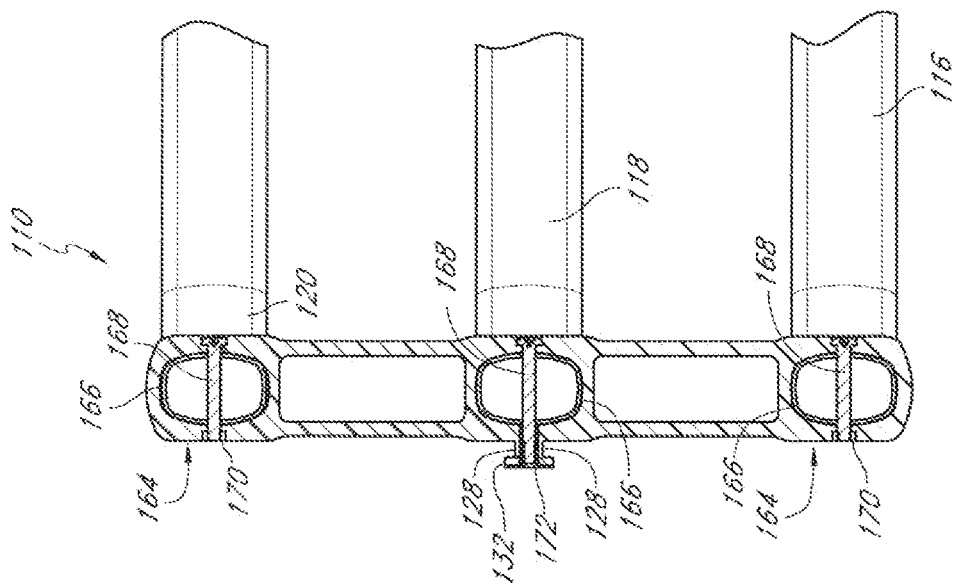
FIG. 16 is a cross-sectional view of a pivot upright of the truck tailgate enclosure of FIG. 1.

FIGS. 15 and 16 illustrate the right pivot upright 110 which is substantially similar to the left pivot upright 108. In the illustrated embodiment, the upright 110 is configured to space apart the tubular members 116, 118, 120 and to cap the distal ends of the tubular members 116, 118, 120. The pivot upright 110 can include three enlarged portions 164 which are configured to receive an end portion of the tubular members 116, 118, 120. The enlarged portions 164 define recesses 166 which are configured to receive and cover end portions of the tubular members 116, 118, 120. The recesses 166 can desirably be closed at one end as shown in FIG. 15.

In the illustrated embodiment, the recesses 166 are further configured to receive fasteners 168, which pass through the enlarged portions 164 and through end portions of the tubular members 116, 118, and 120. The passing of the fastener through the pivot upright 110 and the tubular members 116, 118, 120, can desirably secure the tubular members to the pivot upright 110.

In some embodiments, the fasteners 168 can be 5 mm threaded screws which engage a nut 170 or T-nut 172 located on an outer face of the pivot upright 110. In the illustrated embodiment, the nuts 170 are configured to engage the top tubular member 116 and the bottom tubular member 120 and can desirably be square nuts that are counter sunk into the upright 110. This arrangement of countersunk nut 170 holds the nut 170 when the fastener 166 is tightened.

Figure 3:
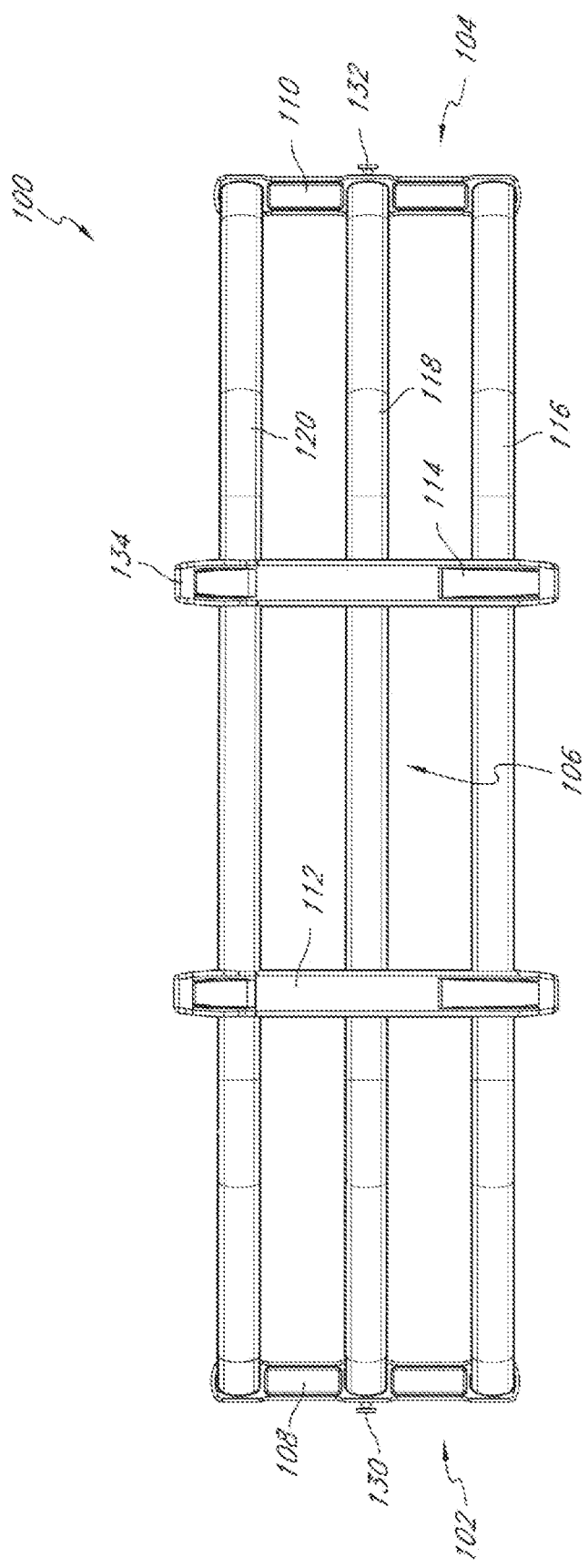
FIG. 3 is a rear view of the truck tailgate enclosure of FIG. 1.
Figure 4:
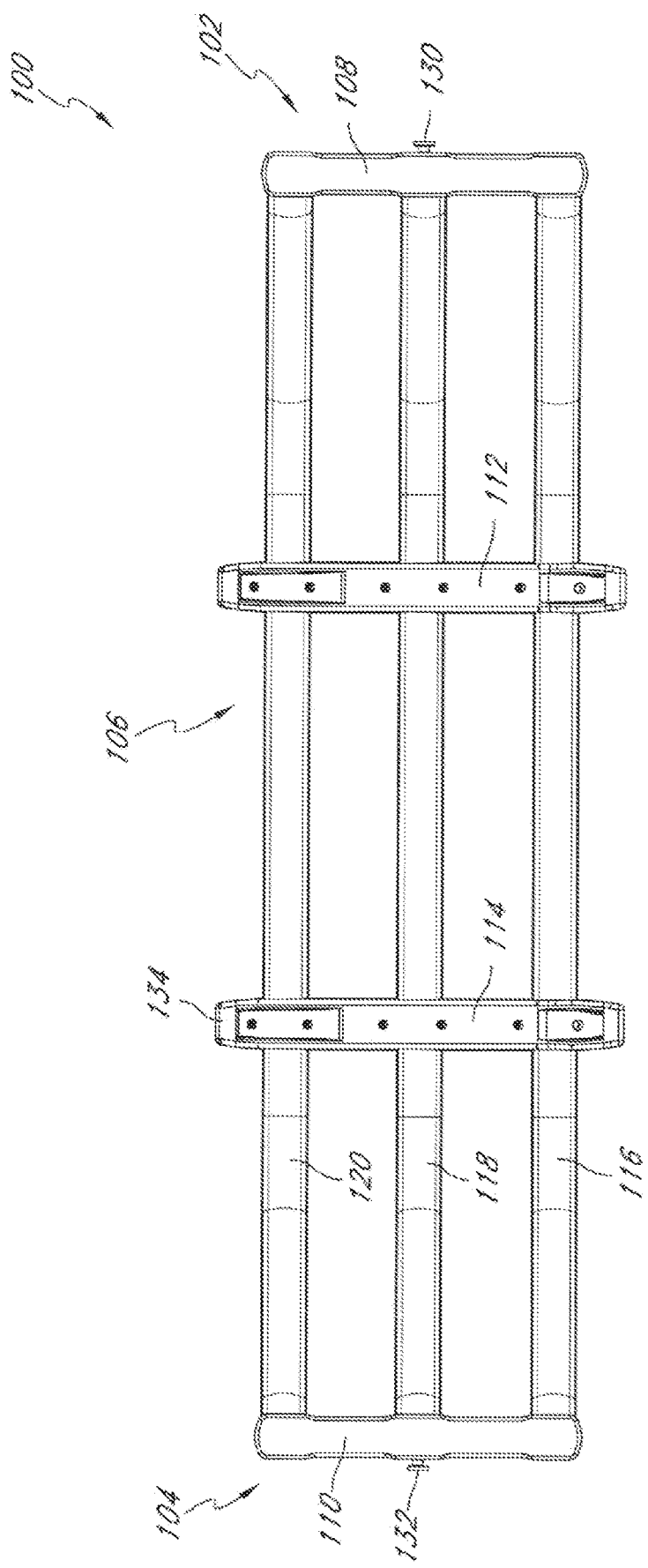
FIG. 4 is a front view of the truck tailgate enclosure of FIG. 1.

In the illustrated embodiment, the middle tubular member 118 is joined to the upright 110 by the fastener 168 and the T-nut 172 The T-nut 172 can be a flanged T-nut with spiral flutes on the body of the T-nut 172. The spiral flutes can be configured to secure the T-nut 172 into the pivot upright 110 when the fastener 168 is tightened with the nut 172. The T-nut can provide structural stability to the pivot mounts 132 and 130 (FIG. 3) which are integrally formed with the pivot uprights 110 and 112 (FIG. 3).

Although the present embodiment has been shown with threaded fasteners 168 and nuts 170 and 172 which pass through the upright 110 and 112 and the tubular members 116, 118, 120, any suitable fasteners or fastening locations can be used. For example, in some embodiments, one, some, or all of the tubular members can be riveted, adhered, or epoxied to the uprights 110, 112.

Figure 18:
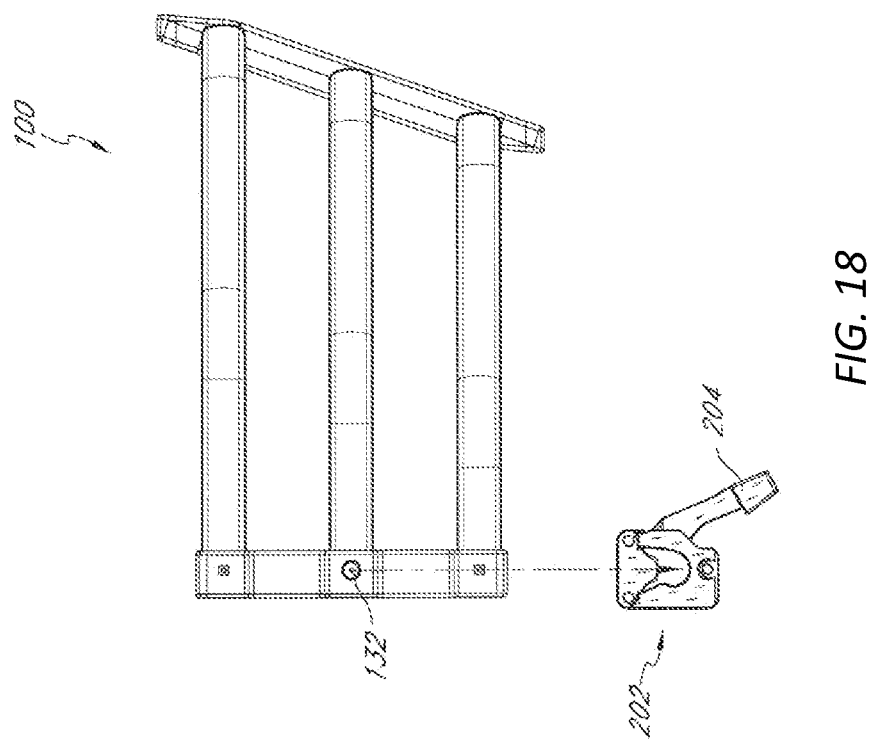
FIG. 18 is a schematic view illustrating a truck bed receiving the tailgate enclosure of FIG. 1 when the tailgate enclosure is in a horizontal orientation.
Figure 17:
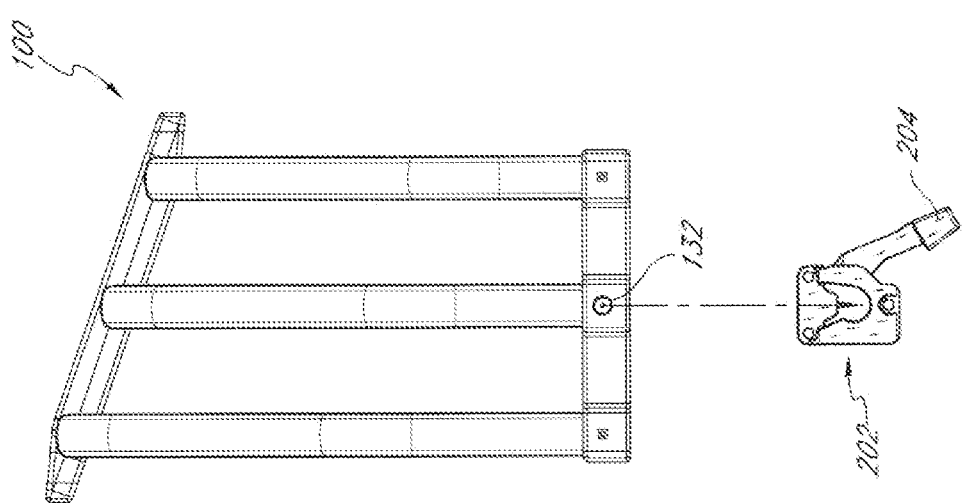
FIG. 17 is a schematic illustrating a truck bed receiving the tailgate enclosure of FIG. 1 when the tailgate enclosure is in a vertical orientation.

FIGS. 17 and 18 illustrate two alternative methods to install the cargo tailgate enclosure 100 in the truck 30 (FIG. 1). Preferably, prior to installation of the cargo tailgate enclosure 100, a latch 202 is installed on each of the side walls 36, 38 of the truck 30. The latches 202 in some embodiments can be substantially similar to the latches described in U.S. patent application Ser. No. 11/105120, filed Apr. 13, 2005. FIGS. 17-18 illustrate a right latch 202 configured to mount to a right sidewall 38 of the vehicle bed. The cargo tailgate enclosure can have a left hand mirrored counterpart (not shown) configured to mount to the left sidewall 36 of the vehicle bed. (FIG. 1). The latches 202 are preferably installed using three threaded fasteners, however, any suitable fastening means such as a rivet, bolt, or adhesive may be used. In one embodiment, the cargo tailgate enclosure 100 includes a template which is used to locate the latches 202 on the proper location of the side wall 36 and the side wall 38 of the truck 30. Once the latches 202 are installed on the cargo bed 32 of the truck 30, the cargo tailgate enclosure 100 can then be mounted to the truck 30.

Figure 20:
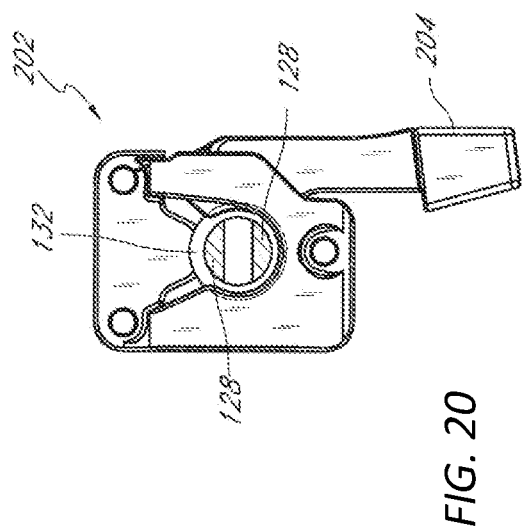
FIG. 20 is a latch which is configured to receive the truck tailgate enclosure of FIG. 1.
Figure 19:
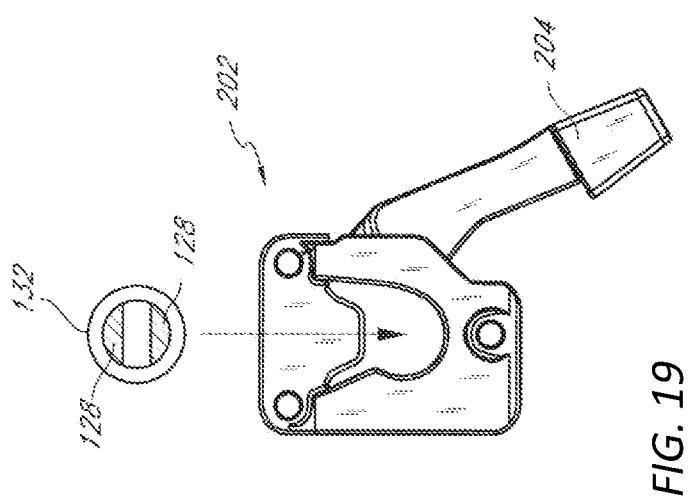
FIG. 19 is a side view of a latch configured to receive the truck tailgate enclosure of FIG. 1.

With reference to FIG. 17, one installation method shown in FIG. 17 includes positioning the cargo tailgate enclosure 100 in a substantially vertical orientation and inserting the left pivot mount 130 and the right pivot mount 132 into the latches 202. When the cargo tailgate enclosure 100 is mounted to the truck 30 using this above-mentioned method, the lever 204 of latches 202 does not require actuation into an open position. Small flats 128 can be formed in the pivot mounts 130 and 132 (FIG. 19). The flats 128 can be oriented to provide a thinner diameter of the pivot mounts 130, 132 when the cargo tailgate enclosure 100 is in a substantially vertical position (FIG. 19) as compared to when the cargo tailgate enclosure 100 is in a horizontal position (FIG. 20). Thus, the cargo tailgate enclosure 100 can be mounted to the truck 30 by placing the tailgate enclosure in a vertical position without a need to actuate the lever 204.

With reference to FIG. 18, the latches 202 can include a mechanism to allow the tailgate enclosure 100 to be mounted to the truck 30 in a substantially horizontal position as shown in FIG. 18. The mechanism includes a lever 204 coupled to a retention member. The lever 204 can be repositioned between an open position (shown in FIG. 19) of the latch 202 in which the pivot mount 132 can be freely inserted or removed into the latch 202, and a closed position in which the pivot mount 132 is rotatably secured to the latch 202. (shown in FIG. 20). This lever 204 mechanism engages the latches 202 and allows the cargo tailgate enclosure 100 to be mounted to the truck 30 in a substantially horizontal position. This is particularly advantageous when transporting a large item such as the motorcycle 60 of FIG. 9 which may block the cargo tailgate enclosure 100 from being rotated to a substantially vertical position.

Once the cargo tailgate enclosure 100 is engaged with the latches 202, it is possible to rotate the cargo tailgate enclosure 100 throughout approximately 180 degrees which allows the cargo tailgate enclosure to be placed in multiple positions including those illustrated in FIGS. 9-10 assuming it is not blocked by cargo in the bed 32. If it is desired to mount the cargo tailgate enclosure 100 in the position shown in FIG. 11, it is possible to install a second set of latches 202 on a forward portion of the cargo bed 32 of the truck 30 or it is simply possible to set the cargo tailgate enclosure 100 in the location of the cargo bed 32 shown in FIG. 11.

With reference to FIGS. 17-20, when it is desired to remove the cargo tailgate enclosure from the truck 30, the following procedures can be used. If the cargo tailgate enclosure 100 is in the substantially horizontal position, shown in FIG. 18, and cannot be rotated to a substantially vertical position, then the user must actuate the latches 202 by rotating the lever 204 which releases the pivot mount 130 or 132 from the latches 202. If the cargo tailgate enclosure 100 can be rotated to a substantially vertical position, the tailgate enclosure can simply be lifted vertically out of the latches 202 without the rotation of the lever 204 due to the flats 128.

Although the embodiment of the cargo tailgate enclosure 100 has been shown incorporating the use of the latches 202, it is contemplated that in other embodiments, any suitable latch or attachment method may be used to attach the cargo tailgate enclosure 100 to the truck 30. It is desirable that suitable attachment hardware provides a rotational degree of freedom; however, attachment hardware that do not provide a rotational degree of freedom may also be used. Also, the latches 202 or any other suitable attachment hardware can be positioned at any point along the cargo bed 32 as may be desirable by a user.

Figure 21:
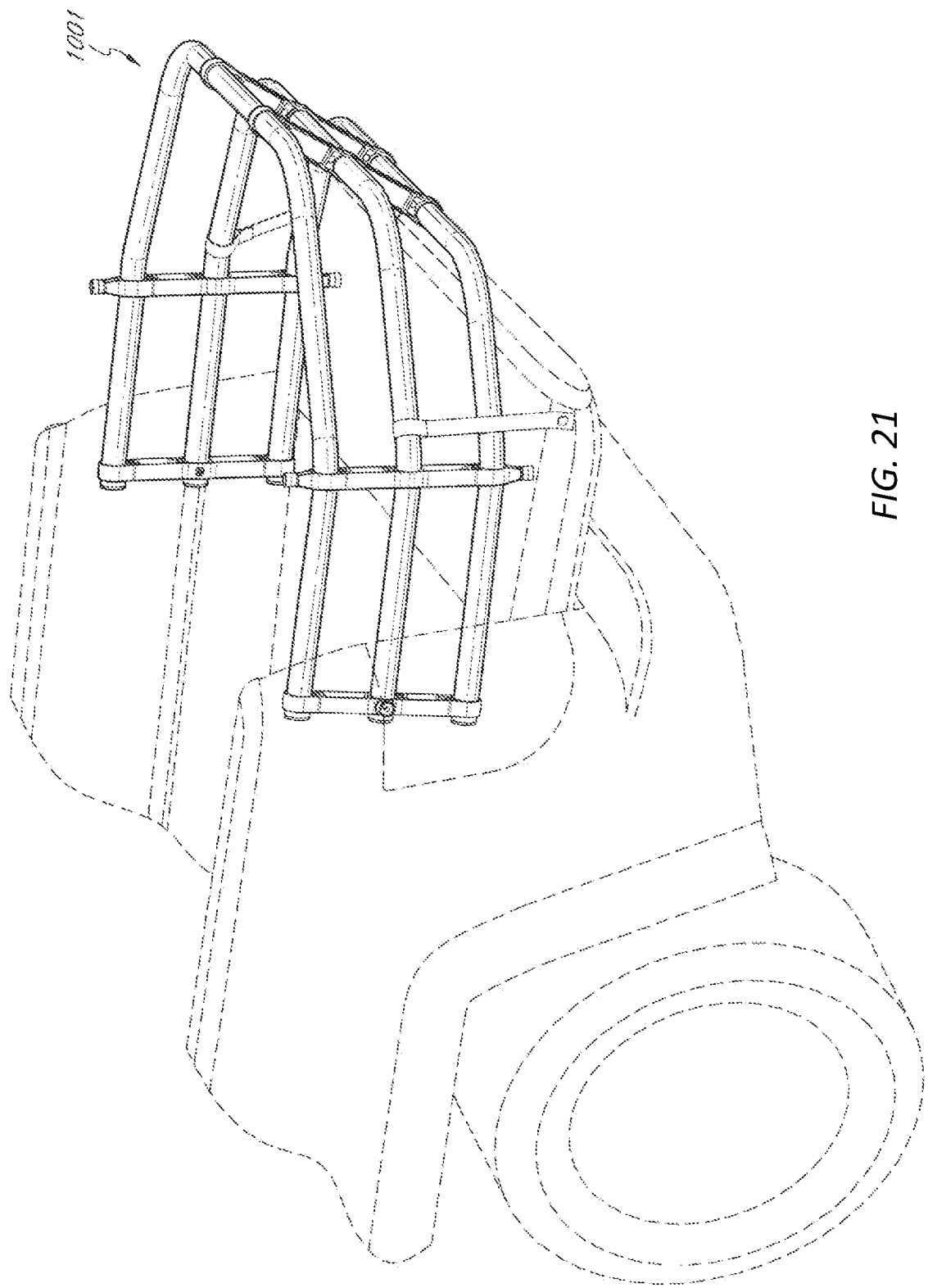
FIG. 21 is a perspective view of another embodiment of a truck tailgate enclosure of the present invention mounted on a truck over the tailgate.
Figure 22:
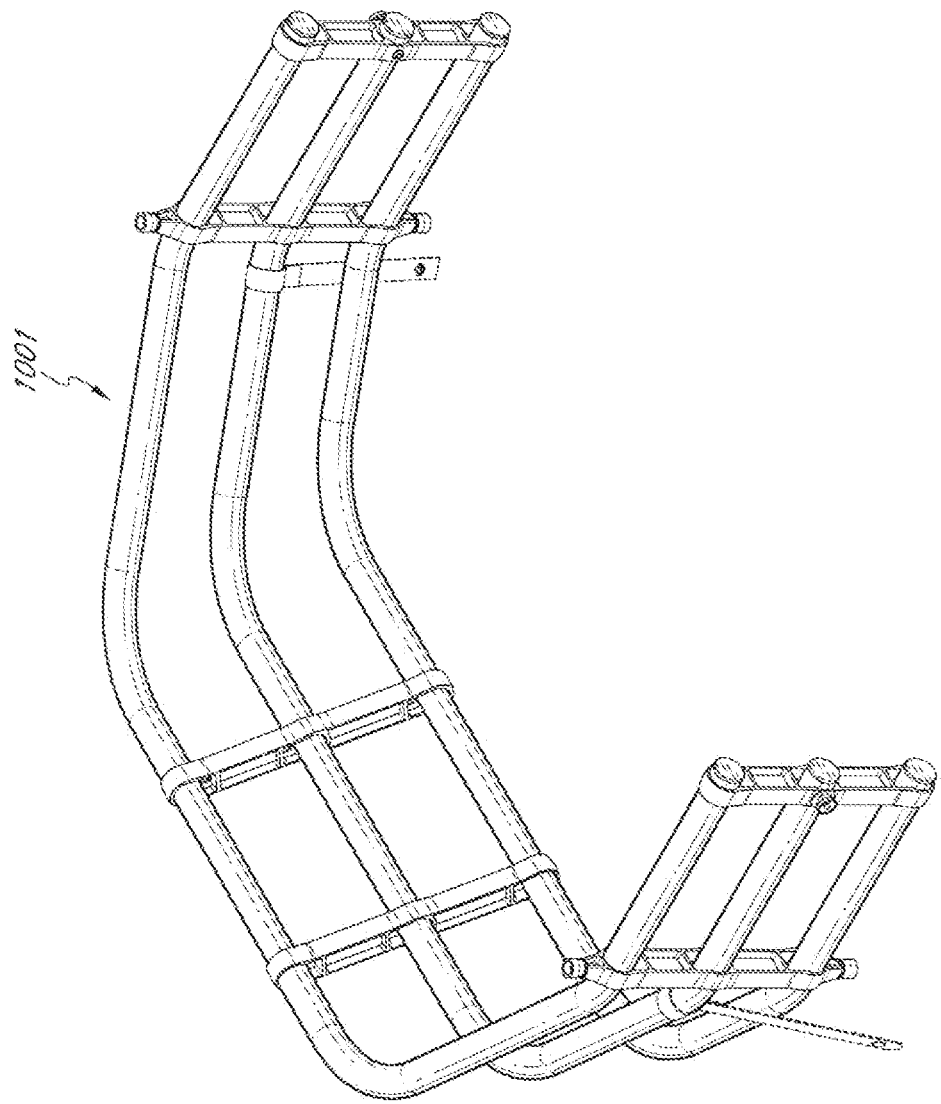
FIG. 22 is a perspective view of the truck tailgate enclosure of FIG. 21.

With reference to FIGS. 21 and 22, another embodiment of the tailgate enclosure 1001 is shown. The tailgate enclosure 1001 is generally similar to the above described tailgate enclosure 100 however; the tailgate enclosure 1001 includes tubular members that comprise a generally circular cross-sectional shape. The tailgate enclosure 1001 illustrated in FIGS. 21 and 22 also comprises an additional set of uprights. The additional set of uprights are configured to act as bumpers and are configured to be located centrally on the side walls of the tailgate enclosure. The tailgate enclosure shown in FIGS. 21 and 22 comprises a generally sloped back wall which is substantially similar to the back wall 106 of the above described embodiment. However the sloped back wall of the tailgate enclosure of FIGS. 21 and 22 extends past a distal end of the tailgate so as to provide additional space to the cargo bed.

Although the previous embodiments shown in FIGS. 1-22 have a generally U-shaped that is generally rigid, it can be appreciated by one skilled in the art that the bed extender may be foldable so as to collapse to an altered shape when not in use. Such an embodiment can include folding connections near the transitions from the side walls to the back wall. The foldable connections can be preferably configured such that the side walls can fold back and against the back wall. The foldable connections may be any suitable pivotal connections such as hinges or flexible inserts. Furthermore, any number of foldable connections can be used which may allow the tailgate extender to be folded down a substantially small size.

Figure 23:
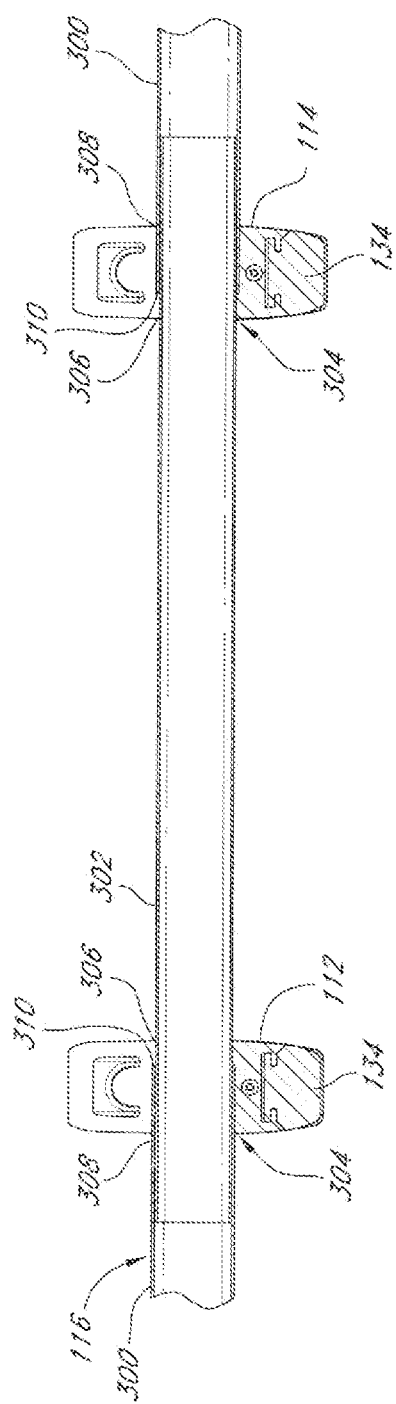
FIG. 23 is cross-sectional back view of an embodiment of a tailgate enclosure with a telescopic back wall system.

With reference to FIG. 23, a cross-sectional view of a cross member 116 and rear uprights 112 and 114 is shown. The cross member 116 is preferably comprised of three members including the two side members 300 and the central member 302. The central member 302 a preferably sized so as to insert into the side members 300. This allows the central member 302 to slide within the side members 300. That is the central member telescopically engages the side members 300. The uprights 112 and 114 further define a stepped hole 304 which is configured to receive and clamp the members 300 and 302. The stepped hole 304 is configured have a first size and shape 308 which is configured to match the shape of the member 300 and a second size and shape 306 which is configured to match the shape of the central member 302. This configuration allows the members 300 and 302 to be adjusted relative to one another and then to be clamped in position with the over edge of the member 300 so be at least partially covered by the uprights 112 and 114. The end of the tubular member 300 may also locate axially with the uprights 112 and 114 at a edge 310 of the hole 304. The edge 310 may also transition the hole 304 from the first size and shape 308 to the second size and shape 306. This arrangement shown in FIG. 23 allows a tailgate enclosure to have an adjustable width with may allow the tailgate enclosure to compensate for width variations in various vehicles. In various embodiments, an adjustable width tubular member, such as that illustrated in FIG. 23 can have a cylindrical profile or a non-cylindrical profile such as that described and illustrated above with respect to FIG. 12.

Although the cargo tailgate enclosure 100, 1001 has been disclosed in the context of certain preferred embodiments and examples, it will be understood by those skilled in the art that the cargo tailgate enclosure extends beyond the specifically disclosed embodiments to other alternative embodiments and/or users of the invention and obvious modifications and equivalent thereof. In particular, while the present cargo tailgate enclosure has been described in the context of a particularly preferred embodiment, a skilled artisan will appreciate in view of the present disclosure that certain advantages, features and aspects of the cargo tailgate enclosure may be realized in a variety of other applications, many of which have been noted above. Additionally, it is contemplated that various aspects and features of the invention described can be practiced separately, combined together, or substituted for one another, and that a variety of combinations and sub-combinations of the features and aspects can be made and still fall within the scope of the inventions. Thus, it is intended that the scope of the present invention herein disclosed, should not be limited by the particular disclosed embodiments described above but should be determined only by a fair reading of the claims.

Figure 24:
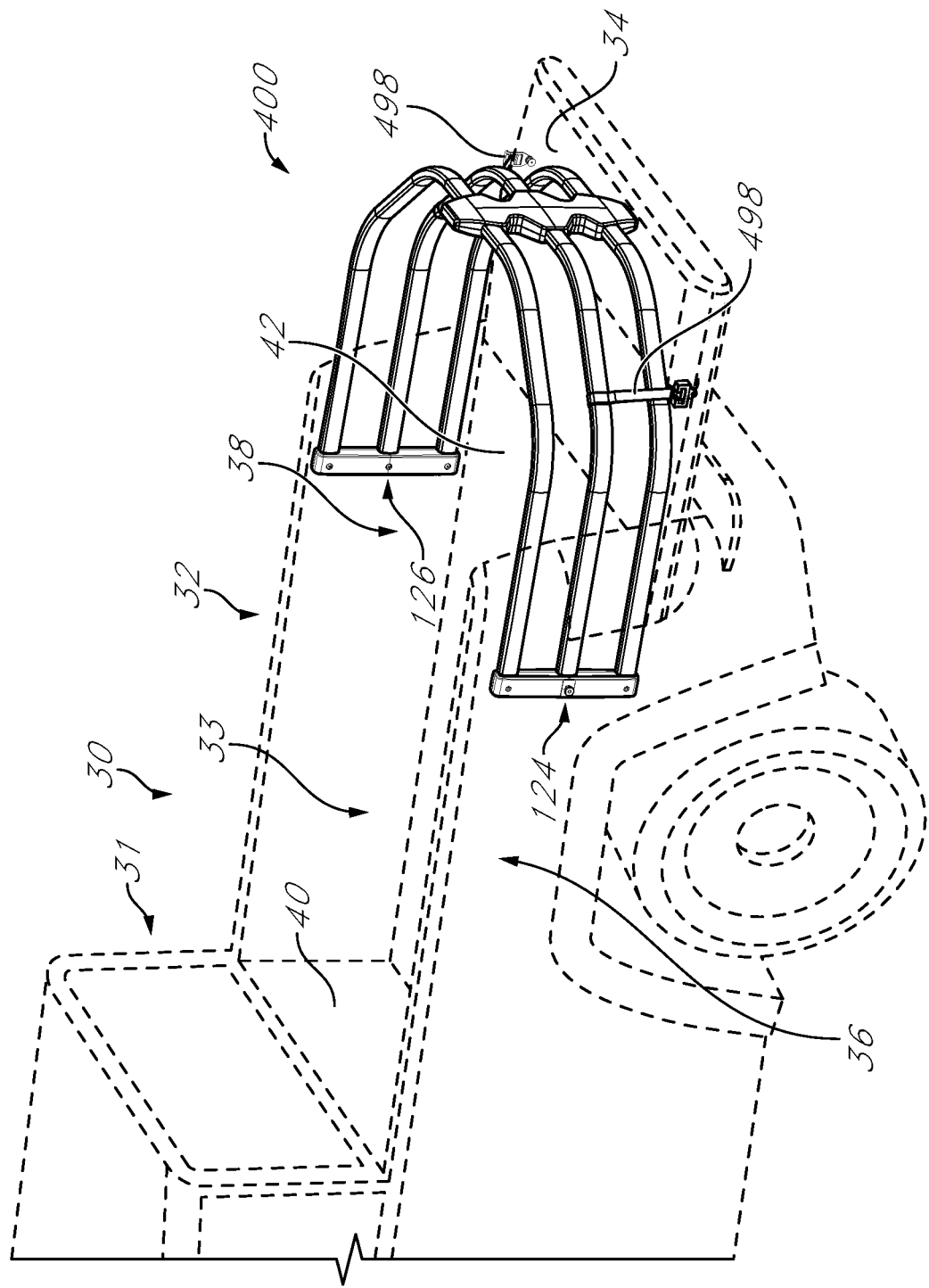
FIG. 24 is a perspective view of another embodiment of a truck tailgate enclosure mounted on a truck over the tailgate.
Figure 25:
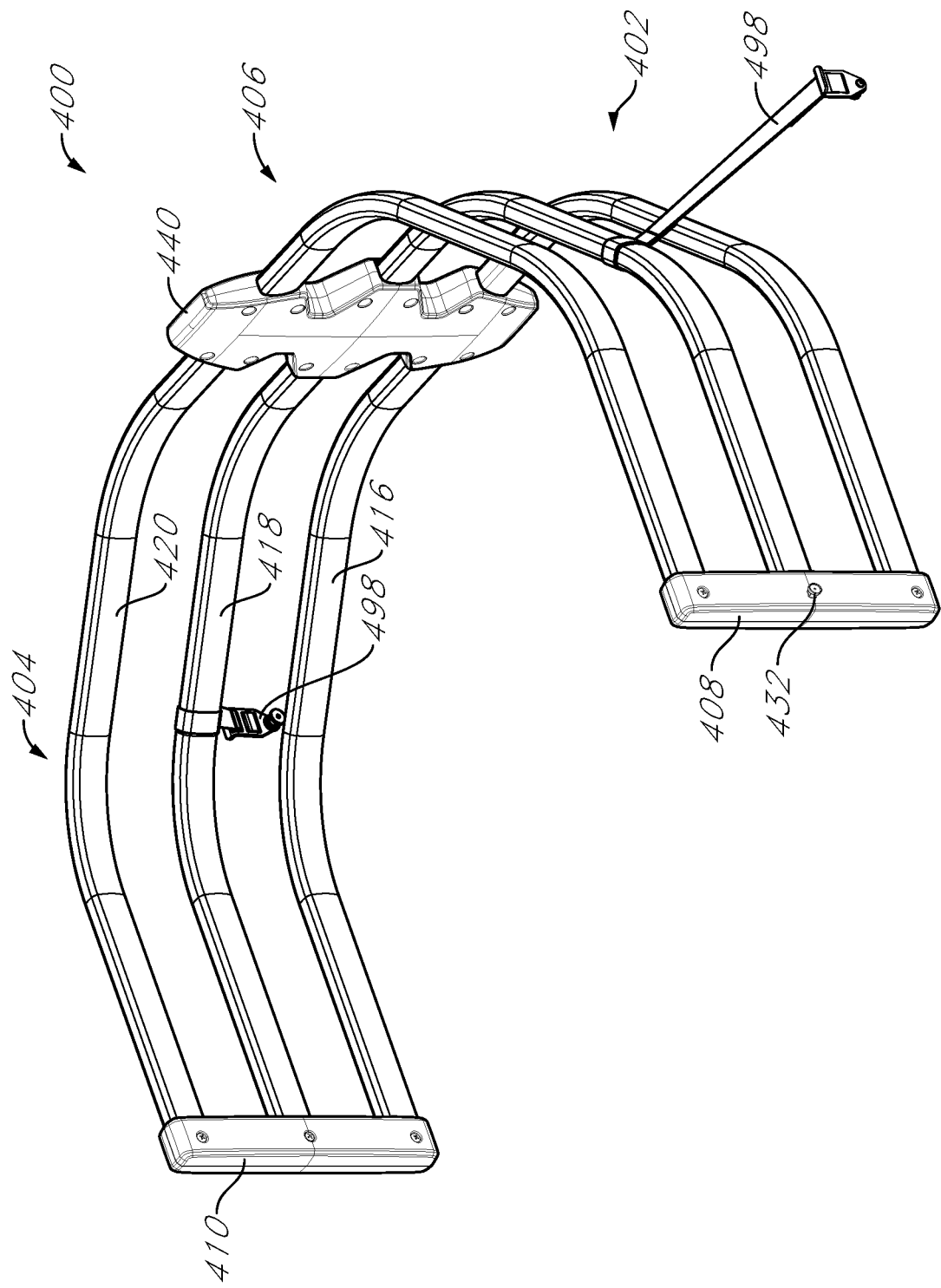
FIG. 25 is a perspective view of the truck tailgate enclosure of FIG. 24.

FIGS. 24-37 illustrate another embodiment of a cargo tailgate enclosure 400, which can be similar to any of cargo tailgate enclosures 100 and/or 1001 in some or many respects. FIG. 24 illustrates cargo tailgate enclosure 400 (also referred to herein as "vehicle tailgate enclosure", "truck tailgate enclosure", and "tailgate enclosure") mounted to the truck 30. As discussed previously, the truck 30 includes a cab 31 and a cargo bed 32 to the rear of the cab 31, and the cargo bed 32 includes a front wall 40, side wall 36, side wall 38, and a tailgate 34 which together define a cargo space 33. Similar to that discussed above with reference to cargo tailgate enclosure 100, the cargo tailgate enclosure can be mounted to the side walls 36, 38, and can increase the cargo space 33 and/or partition the cargo space 33. As shown and as similarly discussed with reference to cargo tailgate enclosure 100, cargo tailgate enclosure 400 can increase the cargo space 33 when the tailgate 34 is in an open position. With reference to FIGS. 24-25, in some embodiments, the cargo tailgate enclosure 400 includes one or more straps 498 that can connect to portions of the cargo tailgate enclosure 400 (such as cross-members 416, 418, 420) and to the tailgate 34.

With reference to FIG. 24, in its deployed position, the cargo tailgate enclosure 400 may comprise a generally U shape which, in the position illustrated in FIG. 24, is open towards the front of the truck 30. Similar to cargo tailgate enclosure 100, the cargo tailgate enclosure 400 can include a left side wall 402, a right side wall 404, and a connecting wall 406 (see FIGS. 25-26). In the position illustrated in FIG. 24, the left side wall 402 extends rearward from the left side wall 36 of the truck 30 and the right side wall 404 extends rearward from the right side wall 38 of the truck 30. The connecting wall 406 can connect rearward portions of the side wall 402 and the side wall 404 and to at least partially enclose the cargo space 33 of the truck 30. Similar to that discussed above with reference to cargo tailgate enclosure 100, the cargo tailgate enclosure 400 is desirably pivotally connected to the left side wall 36 and the right side wall 38 of the truck 30 at pivot connection 124 and pivot connection 126. The cargo tailgate enclosure 400 can be rotated about the pivot connections 124, 126. The pivotal nature of the connections 124, 126 different configurations in which the cargo tailgate enclosure 100 can be positioned without disconnecting the cargo tailgate enclosure 400 from the side wall 36 and the side wall 38 and is discussed in greater detail elsewhere herein. As will be appreciated, non-pivoting connections are also possible.

The cargo tailgate enclosure 400 can include a plurality of cross-members. Such cross-members can define and/or form the side walls 402, 404, and/or connecting wall 406 discussed above, for example. As discussed above, the cross-members can be tubular, among other shapes and/or configurations. For example, as shown in FIGS. 24-33, the cargo tailgate enclosure 400 can include three cross-members, including a first cross-member 420 (which can be a topmost one of the cross-members), a second cross-member 418 (which can be a middle or intermediate one of the cross-members), and a third cross-member 416 (which can be a bottommost one of the cross-members closest to the tailgate 34). The cross-members 420, 418, 416 can extend along a horizontal plane and be spaced from one another, for example, vertically as shown. Each of the cross-members 420, 418, 416 can include one or more members that together form or define each of the cross-members 420, 418, 416. For example, with reference to at least FIGS. 25-30 and 33, cross-members 420, 418, 416 can each include three members that connect and/or otherwise engaged one another to form each of the cross-members 420, 418, 416. For example, cross-member 420 can include side members 420a, 420c and central member 420b, cross-member 418 can include side members 418a, 418c and central member 420b, and/or cross-member 416 can include side members 416a, 416c and central member 416b. While the figures illustrate the tailgate enclosure 400 having three cross-members 420, 418, and 416, each including three members (respectively, 420a, 420b, 420c, 418a, 418b, 418c, 416a, 416b, 416c), the tailgate enclosure 400 can have an alternative number of cross-members each of which comprise an alternative number of members. For example, the tailgate enclosure 400 can include one, two, three, four, five, six, or seven or more cross-members, each of which are formed of one, two, three, four, five, or six or more members which may be separable from one another. Each of the cross-members 420, 418, 416 can have a tubular shape, or any of the shapes and/or configurations discussed above with reference to cargo tailgate enclosure 100 and/or 1001. The members 420a, 420b, 420c, 418a, 418b, 418c, 416a, 416b, 416c may comprise beams, as shown in the figures.

As shown throughout FIGS. 24-33, the cargo tailgate enclosure 400 can include uprights 408, 410, which can be similar to uprights 108, 110 in some, many, or all respects. Additionally, as discussed in greater detail below, the tailgate enclosure can include an additional upright 440. The uprights 408, 410 can secure and/or secure to cross-members 420, 418, 416 or portions thereof (for example, ends thereof). With reference to at least FIG. 33, the uprights 408, 410 can be configured to substantially cap open distal ends of the cross-members 416, 418, and/or 420. The uprights 410, 408 can be further configured to include a pivot mounts 430, 432 (FIGS. 25-26) which can be identical to the pivot mounts 130, 132 discussed above with reference to tailgate enclosure 100. The pivot mounts 430, 432 can secure the cargo tailgate enclosure 400 to the left side wall 36 and the right side wall 38 of the truck 30. The pivot mounts 430, 432 can be secured to latches, such as the latches 202, in a similar or identical manner as discussed above with reference to cargo tailgate enclosure 100. Accordingly, the discussion above with respect to pivot mounts 130, 132 and latches 202 and at least FIGS. 15-20 is equally applicable to the pivot mounts 420, 432 and is not repeated here for the sake of brevity. For example, the cargo tailgate enclosure 400 can be installed and/or secured to the truck 30 in an identical manner as that discussed with respect to FIGS. 17-20 above. Additionally, the cargo tailgate enclosure 400 can be moved (for example, rotated) and/or positioned as discussed above with respect to cargo tailgate enclosure 100 and at least FIGS. 9-11. Additionally, as discussed above with reference to cargo tailgate enclosure 100, it is contemplated that in other embodiments, any suitable latch or attachment method may be used to attach the cargo tailgate enclosure 400 to the truck 30.

The connection and/or securement of the uprights 408, 410 to ends of the cross-members 416, 418, 420 can be identical in some or many respects as the connection and/or securement of the uprights 108, 110 as discussed above with reference to at least FIGS. 15-16. For example, the uprights 408, 410 can include recesses similar or identical to recesses 166 to receive and/or cover ends of cross-members 416, 418, 420 and fasteners 168 which can extend through holes near the ends of cross-members 416, 418, 420 and secure to and/or within portions of the recesses of the uprights 408, 410. Further, with reference to FIG. 33, such fasteners 168 can engage nuts 170 and/or 172 in a similar or identical manner as that discussed above with respect to cargo tailgate enclosure 100 and FIG. 16. In one embodiment, the uprights 408, 410 are identical to the uprights 108, 110 except with respect to not having the enlarged portions 164 discussed above. For example, in such embodiment, the upright 408, 410 can have a uniform outer surface and/or exterior, as shown in at least FIG. 33. The discussion above with respect to uprights 108, 110, fasteners 168, nuts 170, 172, recesses 166, pivot mounts 130, 132, cross-members 116, 118, 120, and/or other components discussed above with respect to FIGS. 15-16 is equally applicable to uprights 408, 410 and cross-members 416, 418, 420.

The cross-members 420, 418, 416 and/or portions thereof can be a metallic material such as 6061-T6 Aluminum or stainless steel and the uprights 408, 410, 440 can desirably be made of a high strength plastic material. Where the cross-members 420, 418, 416 include a plurality of beams, such as beams 420*a*, 420*b*, 420*c*, 418*a*, 418*b*, 418*c*, 416*a*, 416*b*, 416*c*, such beams 420*a*, 420*b*, 420*c*, 418*a*, 418*b*, 418*c*, 416*a*, 416*b*, 416*c* and/or portions thereof can be a metallic material such as 6061-T6 Aluminum or stainless steel. Although the above mentioned materials can desirably be used, other such materials can be used in other embodiments of the tailgate enclosure 400. For example, the cross-members 420, 418, 416 (and/or beams 420*a*, 420*b*, 420*c*, 418*a*, 418*b*, 418*c*, 416*a*, 416*b*, 416*c*) can be made of plastic or metallic materials and/or the uprights 408, 410, 440 can be made of billet aluminum or a composite such as carbon fiber. Any of cross-members 420, 418, 416 and/or beams 420*a*, 420*b*, 420*c*, 418*a*, 418*b*, 418*c*, 416*a*, 416*b*, 416*c* can be formed of solid or hollow (for example, tubular) shapes, including but not limited to solid L-angles, L-shaped tubing, I-beams, I-shaped tubing, octagonal tubing, round tubing, square solid bars, square tubing, triangular solid bars, triangular tubing or other suitable shapes. Furthermore, any of cross-members 420, 418, 416 or beams 420*a*, 420*b*, 420*c*, 418*a*, 418*b*, 418*c*, 416*a*, 416*b*, 416*c* can be made of any suitable material such as plastic, composites, steel, and/or aluminum. Any of cross-members 420, 418, 416 and/or beams 420*a*, 420*b*, 420*c*, 418*a*, 418*b*, 418*c*, 416*a*, 416*b*, 416*c* can have a cross-section that is similar or identical to any of the cross-sections discussed above with reference to cross-members 116, 118, 120 of tailgate enclosure 100 and FIG. 12 and therefore the discussion above with reference to these components is not repeated here for the sake of brevity.

As shown in at least FIGS. 24-30, the cross-members 420, 418, 416 can be spaced vertically from one another and can thereby provide passageways for air to pass through the walls 402, 404 and/or 406 of the cargo tailgate enclosure 400, the benefits of which are described above with reference to cargo tailgate enclosure 100 and are not repeated here for the sake of brevity. While FIGS. 24-30 illustrate wall 406 being straight, such wall 406 can be alternatively slanted/sloping in a similar or identical manner as wall 106 of tailgate enclosure 100 as discussed above. For example, wall 406 can be sloped at any of the angles discussed above with respect to cargo tailgate enclosure 100 and FIGS. 7-8.

Figure 26:
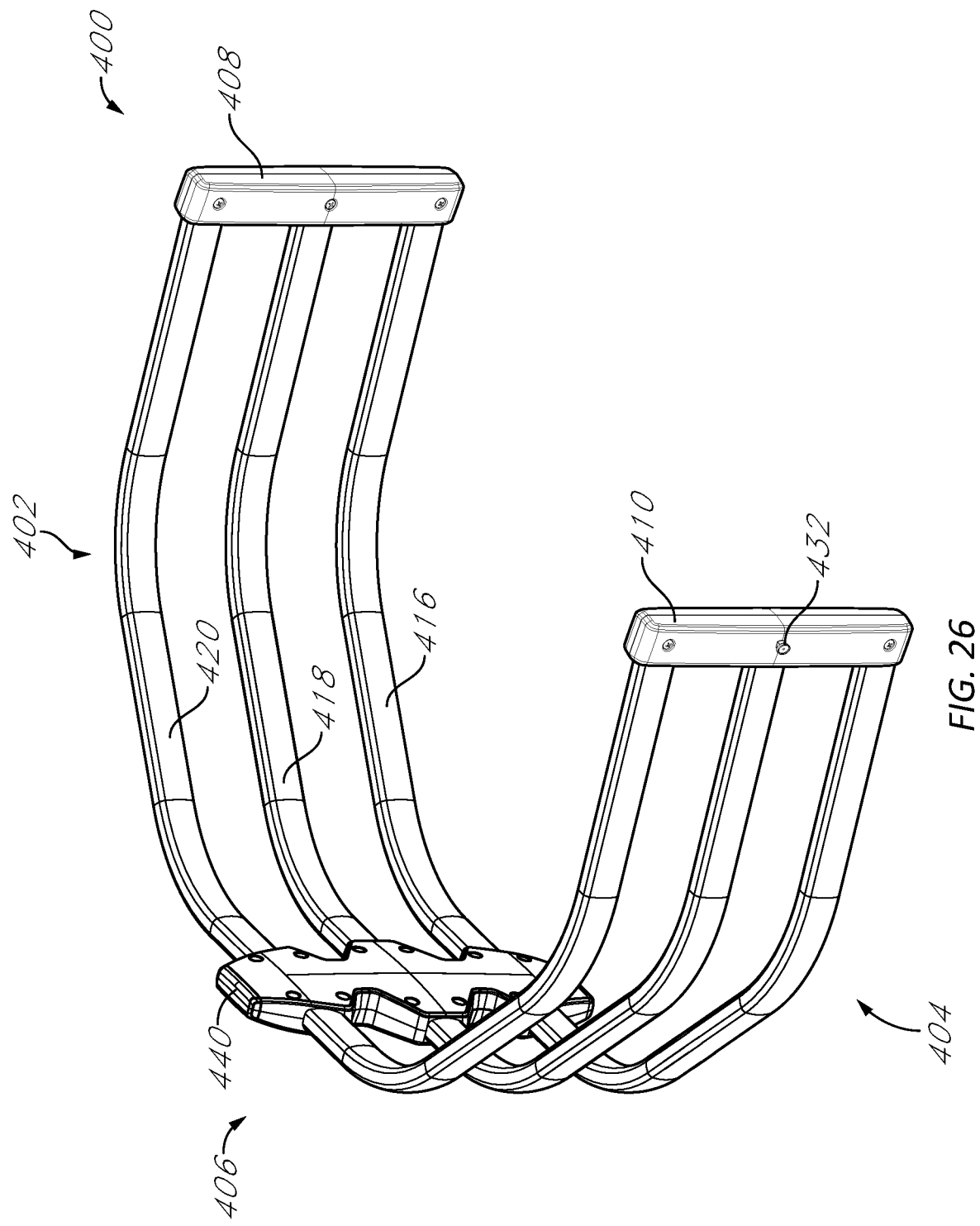
FIG. 26 is another perspective view of the truck tailgate enclosure of FIG. 24.
Figure 29:
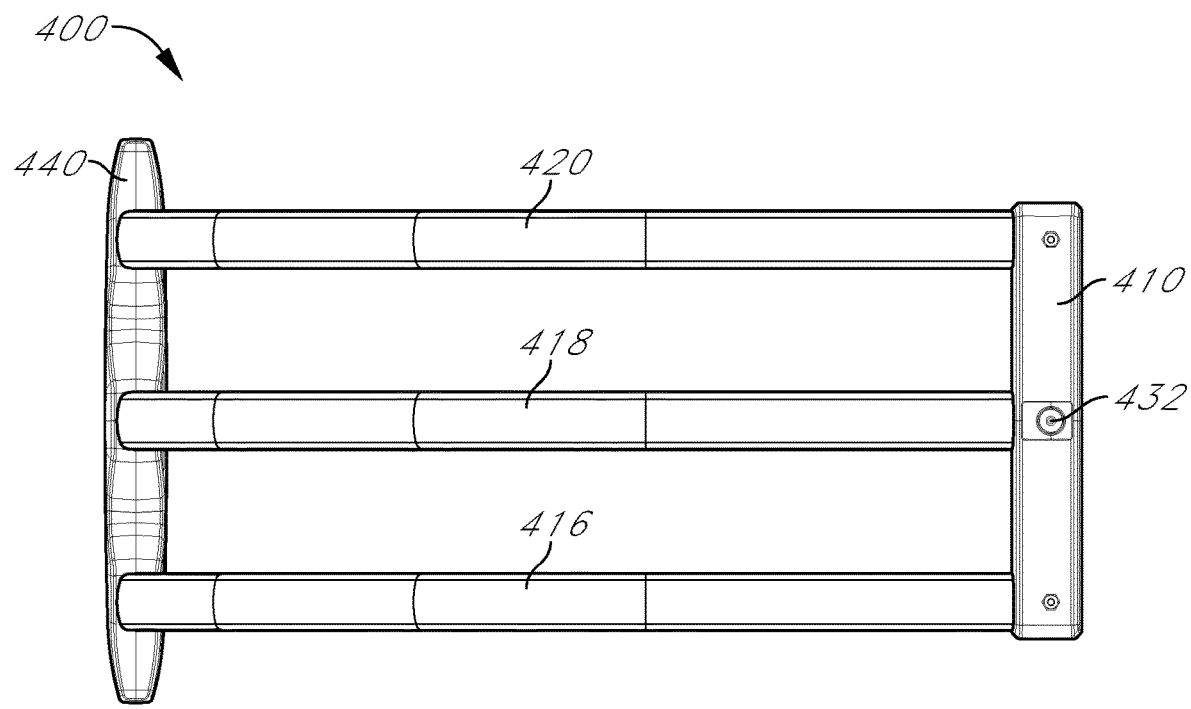
FIG. 29 is a side view of the truck tailgate enclosure of FIG. 24.
Figure 30:
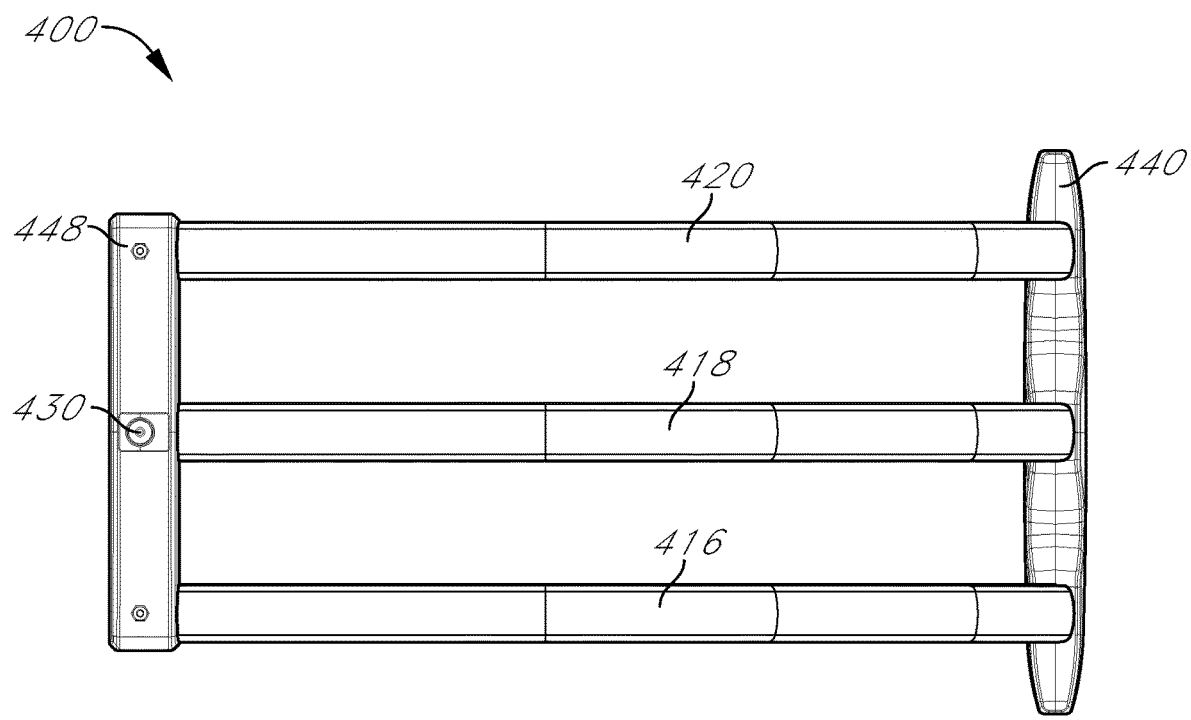
FIG. 30 is another side view of the truck tailgate enclosure of FIG. 24.
Figure 31:
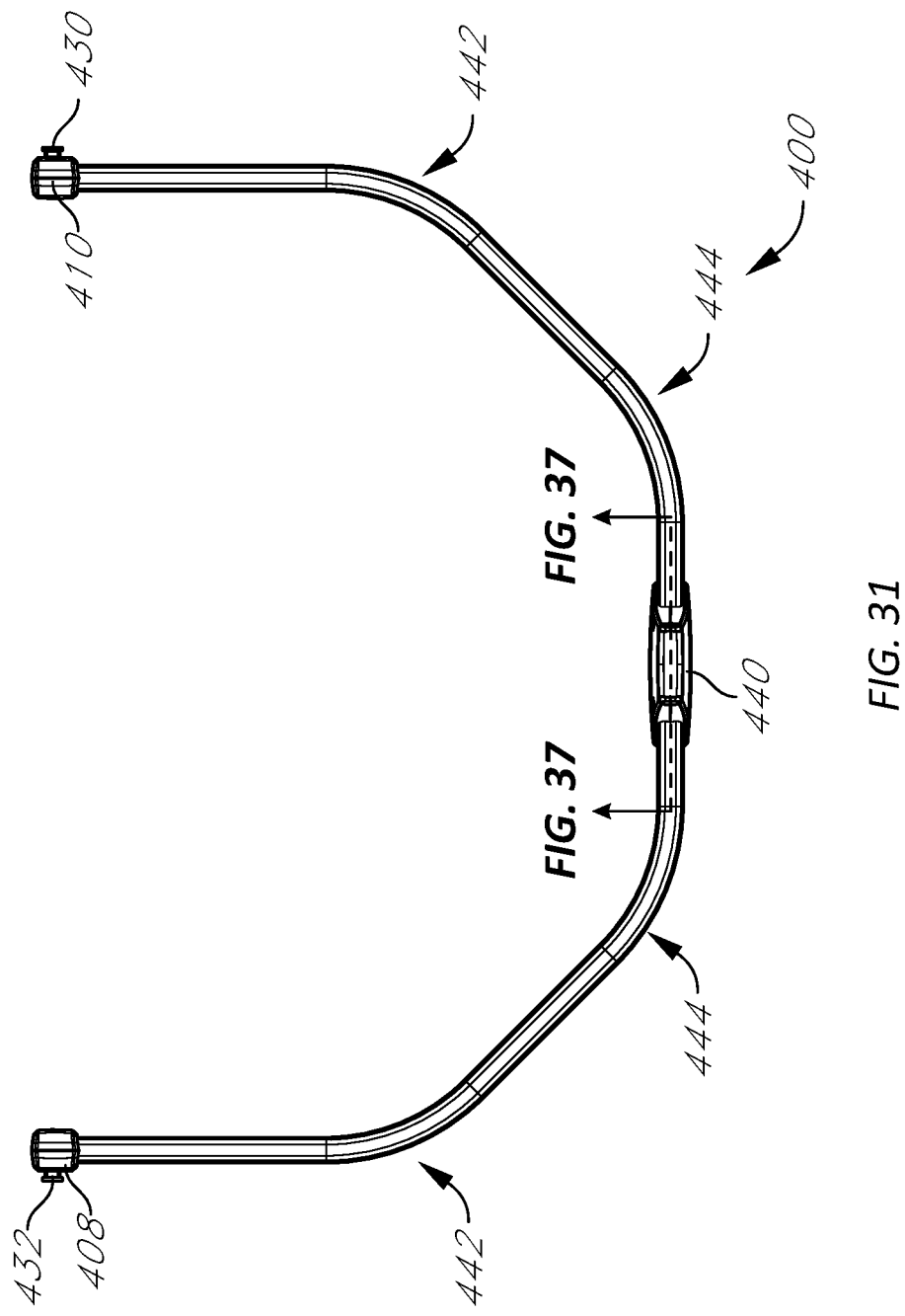
FIG. 31 is a top view of the truck tailgate enclosure of FIG. 24.
Figure 32:
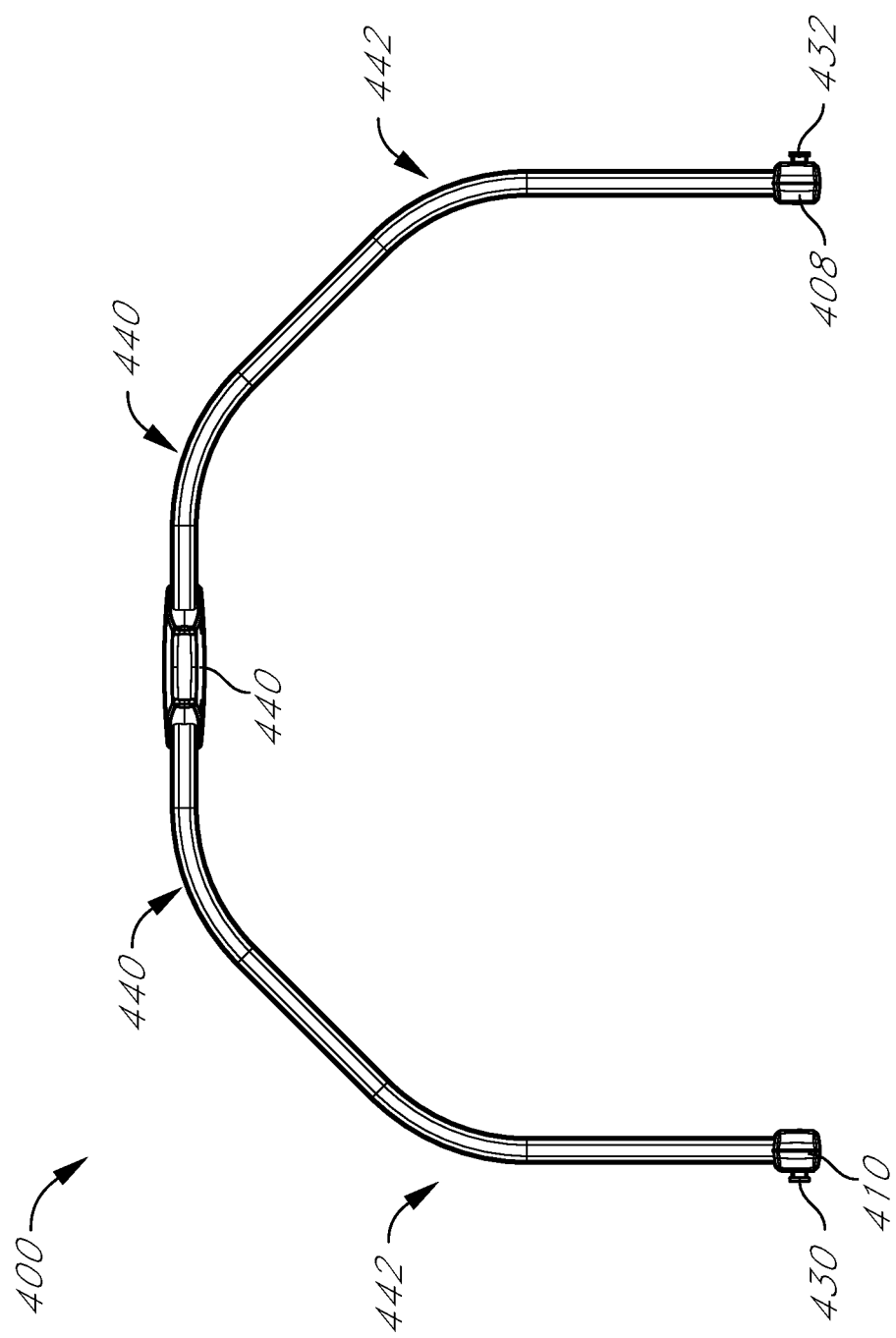
FIG. 32 is a bottom view of the truck tailgate enclosure of FIG. 24.
Figure 33:
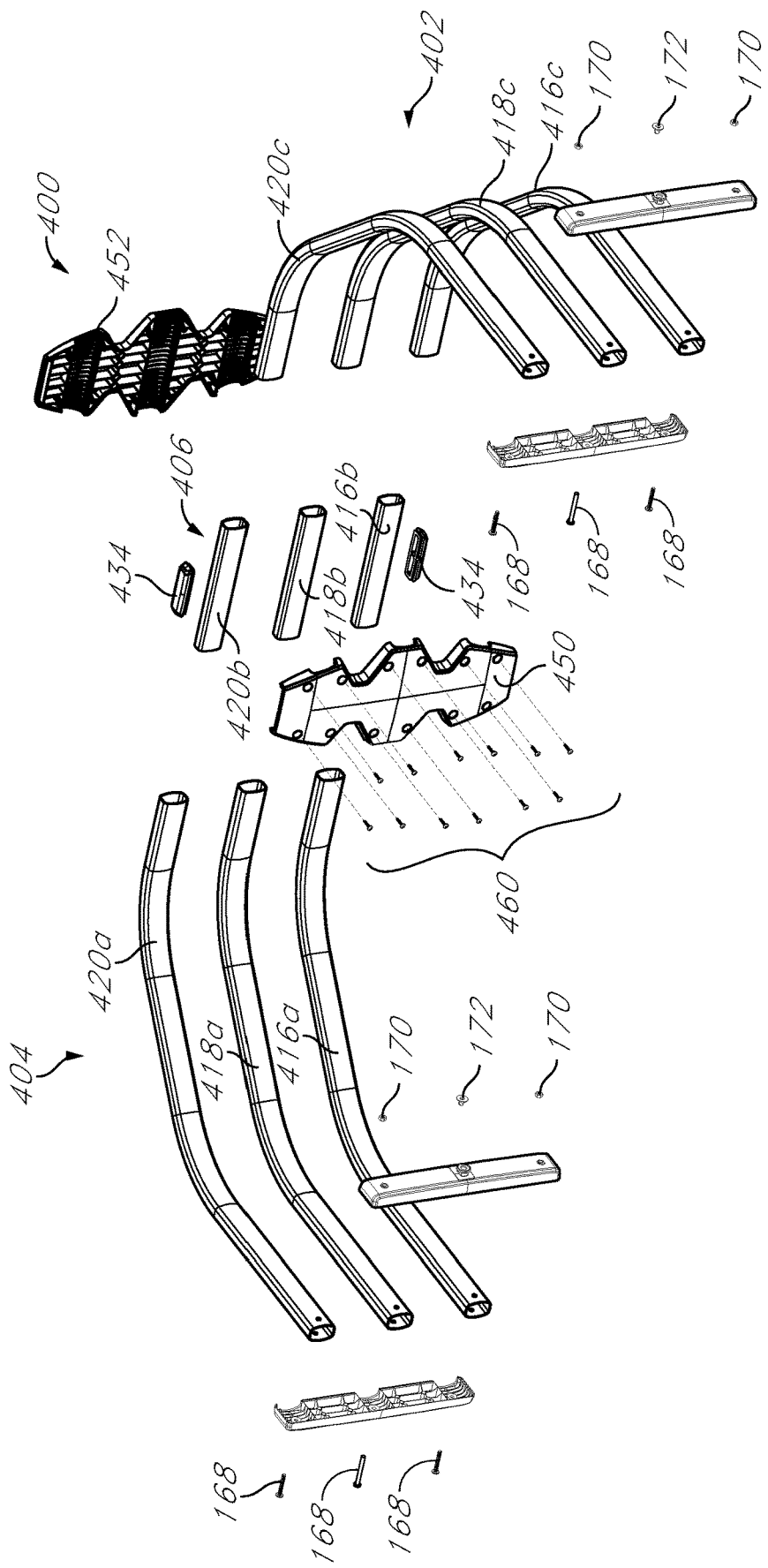
FIG. 33 is an exploded perspective view of the truck tailgate enclosure shown in FIG. 25.

With reference to FIGS. 25-26, the walls 402, 404, and 406 can be formed at least in part by the cross-members 416, 418, and 420. Further, as shown in FIG. 33, wall 402 can be formed by beams 416*c*, 418*c*, and 420*c*, wall 404 can be formed by beams 416*a*, 418*a*, 420*a*, and/or wall 406 can be formed by beam 416*b*, 418*b*, and 420*b*. With reference to FIGS. 31-32, in order to transition between the side walls 402, 404 and the back wall 406, the cross-members 416, 418, and 420 can be bent to achieve the transitions. In one embodiment, the cross-members 416, 418, and 420 each have two bend locations (also referred to herein as "bends" and "bent transitions" and "bend transitions") on each side of the cargo tailgate enclosure 400 including two forward bent transitions 442 and two rearward bent transitions 444. Although the illustrated embodiment shows two bent transitions 442 and 444 any number of bent transitions may be used, including, but not limited to one, three, four, five, or six or more. Such bend locations 440, 442 can be located on beams 416*a*, 418*a*, 420*a* and/or beams 416*c*, 418*c*, 420*c* as shown in FIG. 33. In some embodiments, the beams 416*b*, 418*b*, 420*b* do not have any bend locations, but rather are straight between ends thereof. As also shown, the beams 416*a*, 418*a*, 420*a* can be equal in length to the beams 416*c*, 418*c*, 420*c*, and beams 416*a*, 418*a*, 420*a*, 416*c*, 418*c*, 420*c* can have greater lengths than beams 416*b*, 418*b*, 420*b*.

As shown in at least FIGS. 24-33, the cargo tailgate enclosure 400 can include three uprights: upright 408, upright 410, and upright 440. The cargo tailgate enclosure 400 can include no more than three uprights. The cargo tailgate enclosure 400 can include an upright at each end of the tailgate enclosure 400 (for example, uprights 408, 410) and only one additional upright (for example, upright 440). The upright 440 can be positioned along and/or secured to portions of the cargo tailgate enclosure 400 in between the two uprights 408, 410. For example, the upright 440 can be positioned along and/or secured to portions of the cargo tailgate enclosure 400 equidistantly between the two uprights 408, 410. The upright 440 can be positioned along and/or secured to one or more of walls 402, 404, 406 or portions thereof and/or one or more of cross-members 416, 418, 420 or portions thereof. For example, the upright 440 can be positioned along and/or secured to one or more of beams 420*a*, 420*b*, 420*c*, 418*a*, 418*b*, 418*c*, 416*a*, 416*b*, 416*c* which may form part of the cross-members 416, 418, 420 and/or walls 402, 404, 406. As another example, as illustrated in at least FIG. 33, the upright 440 can be positioned along and/or secured to the central wall 406 and beams 416*b*, 418*b*, 420*b*. As another example, as also illustrated in at least FIG. 33, the upright 440 can be positioned along and/or secured to the central wall 406 and beams 416*b*, 418*b*, 420*b* and can be positioned between opposite ends of each of beams 416*b*, 418*b*, 420*b*. The cargo tailgate enclosure 400 can include uprights 408, 410 at ends of the cargo tailgate enclosure 400 and only one additional upright 440 positioned along and/or secured to the central wall 406 and/or beams 416*b*, 418*b*, 420*b*. In some cases, including only one upright in addition to uprights 408, 410 on ends of the tailgate enclosure 400 can allow tail lights of the truck 30 to be better viewed from behind. For example, the single additional upright 440 can be positioned along and/or secured to the cargo tailgate enclosure 400 (or portions thereof) such that, when the cargo tailgate enclosure 400 is secured to the truck 30 as discussed above, view of the tail lights of the truck 30 can be unobstructed to vehicles and/or vehicle drivers at a wider variety of angles behind the truck 30 than in other embodiments.

Figure 35:
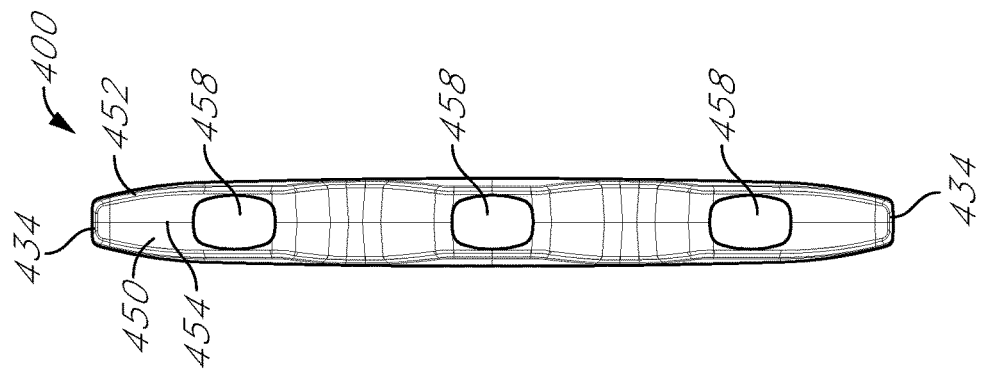
FIG. 35 is a side view of the upright of FIG. 34 in accordance with aspects of this disclosure.
Figure 34:
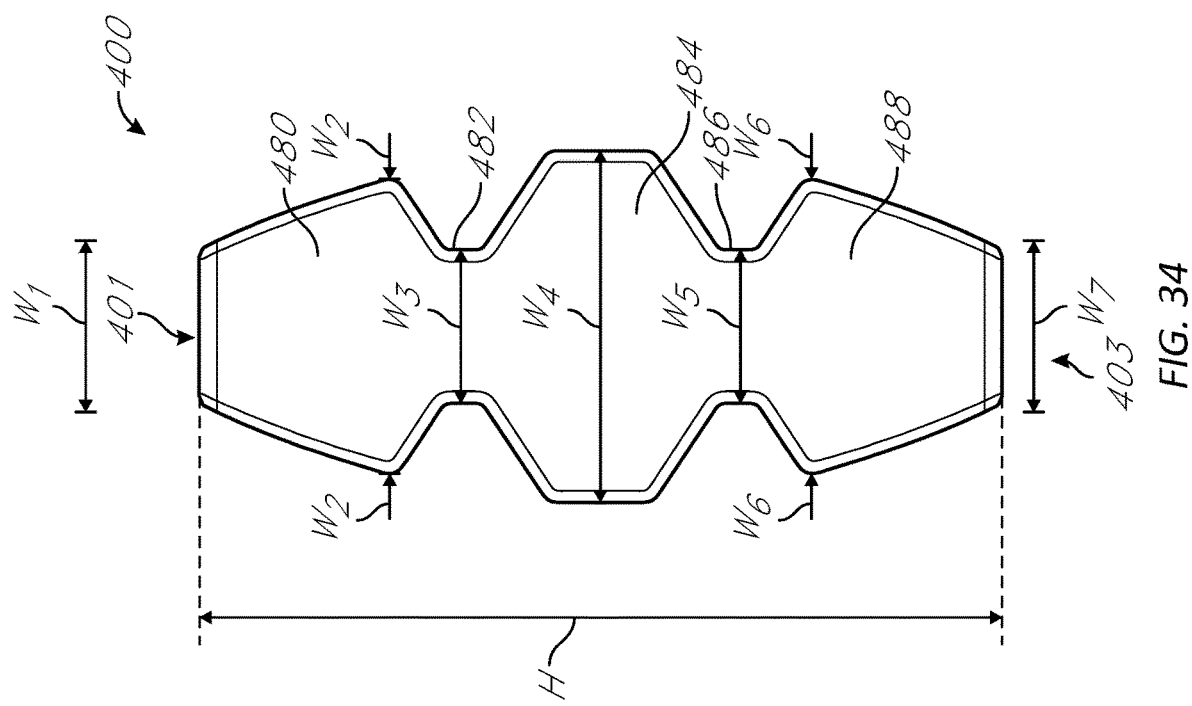
FIG. 34 is a back view of an upright of the truck tailgate enclosure in accordance with aspects of this disclosure.
Figure 36:
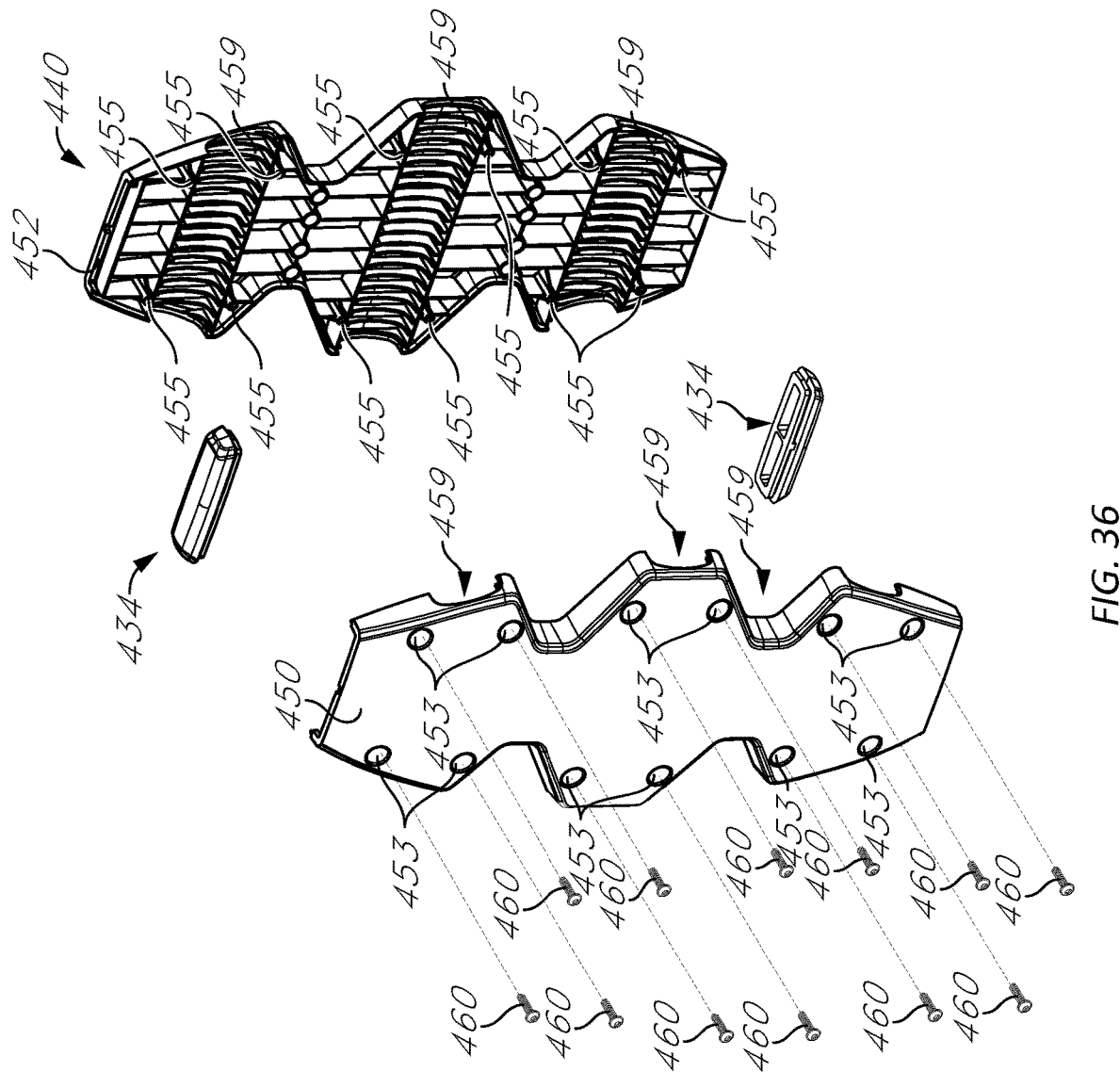
FIG. 36 is an exploded perspective view of the upright of FIG. 34 in accordance with aspects of this disclosure.

FIG. 33 illustrates an exploded view of the cargo tailgate enclosure 400. FIGS. 34, 35, and 36 illustrate a rear, side, and exploded view of the upright 440 of the tailgate enclosure 400, respectively. As shown in FIG. 34, the upright 440 can include a height H extending between a first end 401 and a second end 403 which can be oriented vertically, for example, when the upright 440 is positioned along and/or secured to a straight (e.g., vertical) wall 406 of the tailgate enclosure 400 and the tailgate enclosure 400 is secured to the truck 30 as shown in FIG. 24. As shown, the upright 440 can include one or more wider portions, such as flared portions 480, 484, 488 and one or more stem portions 482, 486. For example, the upright 440 can include three flared portions 480, 484, and 488 and two stem portions 482, 486. Stem portions 482, 486 can be positioned between adjacent ones of the flared portions 480, 484, 488.

As shown, flared portions 480, 484, 488 can have larger cross-sections than stem portions 482, 486. For example, flared portions 480, 484, 488 can have larger widths than stem portions 482, 486. Flared portion 480 can have a first width $W_1$ and a second width $W_2$. Flared portion 480 can gradually transition from the first width $W_1$ to the second width $W_2$. Stem portion 482 can include a width $W_3$, which can be less than or equal to width $W_1$ and/or less than width $W_2$. Flared portion 484 can have a width $W_4$, for example, at an intermediate or middle portion of the flared portion 484. Flared portion 484 can gradually transition from the width $W_4$ to the width $W_3$ of stem portion 482 and/or to the width $W_5$ of the stem portion 486 at ends of the flared portion 484 as shown in FIG. 34. Flared portion 488 can have a first width $W_7$ and a second width $W_6$. Flared portion 488 can gradually transition from the first width $W_7$ to the second width $W_6$. Stem portion 486 can include a width $W_5$, which can be less than or equal to width $W_7$ and/or less than width $W_6$ of flared portion 488. Width $W_3$ and/or $W_5$ can be equal to or less than any of widths $W_1$, $W_7$. Width $W_3$ and/or $W_5$ can be less than any of widths $W_2$, $W_4$, and/or $W_6$. Width $W_1$ and/or $W_7$ can be equal to or less than any of widths $W_2$, $W_4$, and/or $W_6$. Width $W_2$ and/or $W_6$ can be equal to or less than width $W_4$. Width $W_2$ and $W_6$ can be equal or unequal. $W_1$ and $W_7$ can be equal or unequal. Width $W_2$ and $W_6$ can be equal or unequal. As shown in FIG. 34, upright 440 can be symmetrical about an axis extending through a center of upright 440 parallel to height H (e.g., a vertical axis given the view shown in FIG. 34) and/or can be symmetrical about an axis extending through a center of upright 440 perpendicular to height H (e.g., a horizontal axis given the view shown in FIG. 34).

FIG. 35 illustrates a side view of upright 440. Similar to uprights 112, 114 discussed above with respect to cargo tailgate enclosure 100 and FIGS. 13-14a, upright 440 can include a first shell portion 450 and a second shell portion 452 and can include one or more (for example, a plurality of) channels 458 which can be similar to channels 158 discussed above. The upright 440 can include one or more caps or bumpers 434 which can connect to the shell portions 450, 452 at ends of the upright 440 (see FIGS. 35-36). The bumpers 434 can mount to the upright 440 and/or shell portions 450, 452 by a tongue-and-groove arrangement, for example. The bumpers 434 can comprise a rubber material to reduce the risk of damaging the bed floor 42 or tailgate 34 (see FIG. 24) when the cargo enclosure 400 is in various positions as discussed above with respect to cargo tailgate enclosure 100.

With reference to FIGS. 35-36, the upright 440 can include one or more or a plurality of channels 458, such as one, two, three, four, five, or six or more channels 458. Each of the channels 458 can be sized and/or shaped to receive and/or secure one or more of cross-members 416, 418, 420 and/or beams 420a, 420b, 420c, 418a, 418b, 418c, 416a, 416b, 416c. The shell portions 450, 452 can separate (e.g., "split") along the split line 454 and each can define a series of partial channels 459 (see FIG. 36) which cooperate together to form the channels 458 to allow the one or more of cross-members 416, 418, 420 and/or beams 420a, 420b, 420c, 418a, 418b, 418c, 416a, 416b, 416c to be positioned and/or secured within in the channels 458 defined by the upright 440. As shown in FIG. 36, the shell portions 450, 452 can be secured together with one or more fasteners 460 (for example, threaded fasteners) which can extend through holes 453 in the shell potion 450 and secure to and/or within cavities 455 (which can be threaded). As shown, one or more or a plurality of the holes 453 and/or one or more or a plurality of the cavities 455 can be located in the flared portions 480, 484, 488 of the upright 400. In some embodiments, the one or more or a plurality of the holes 453 and/or the one or more or a plurality of the cavities 455 are only positioned the flared portions 480, 484, and/or 488 and are not located in the stem portions 482, 486.

Figure 37:
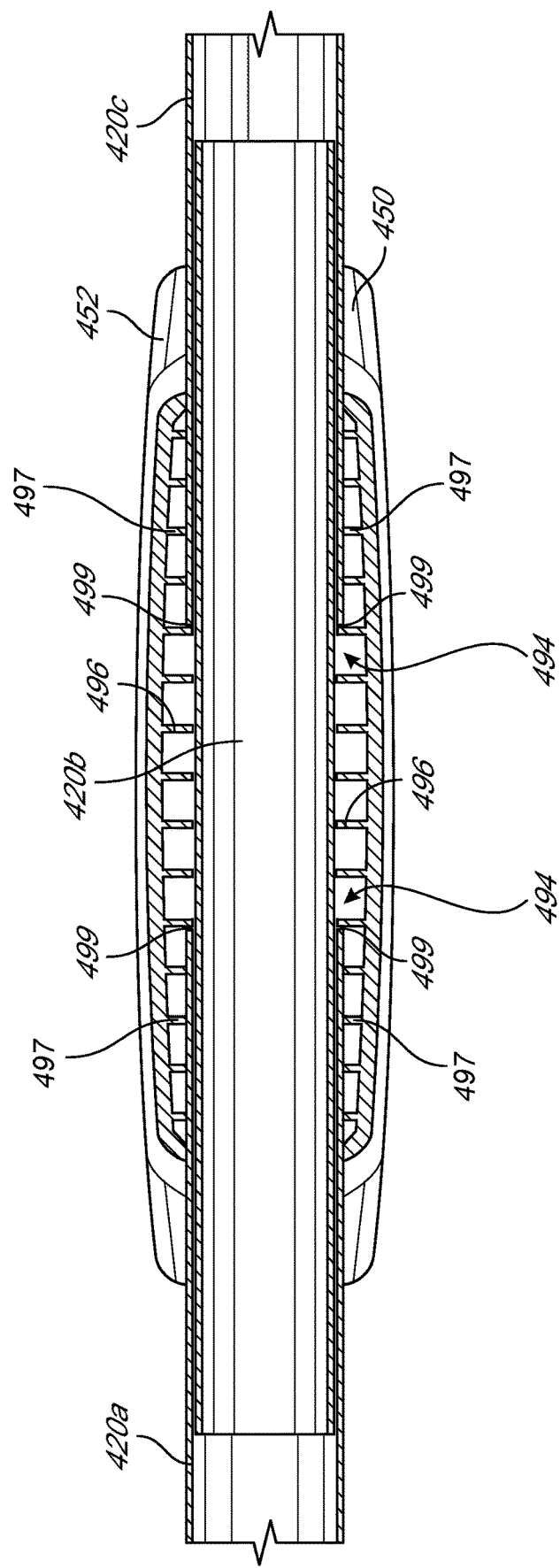
FIG. 37 is an enlarged cross-sectional view of a portion of the truck tailgate enclosure of FIG. 24 with a telescopic back wall system.

FIG. 37 illustrates a cross-section through a portion of the cargo tailgate enclosure 400 shown in FIG. 31. More specifically, FIG. 37 illustrates a cross-section through beams 420a, 420b, 420c and the upright 440 along one of the channels 458. As discussed above, the cross-member 420 can be formed of beam 420a, 420b, 420c. Although FIG. 37 illustrates a cross-section through beams 420a, 420b, 420c and the upright 440 along one of the channels 458, such cross-section can be representative of a cross-section through beams 418a, 418b, 418c and/or beams 416a, 416b, 416c and the upright 440 along a different one of the channels. Accordingly, the discussion below with reference to the cross-section shown in FIG. 37 can be equally applicable to other cross-sections of the tailgate enclosure 400, for example, along a height of the upright 440. The beam 420b can be sized and/or shaped so as to insert into the beams 420a, 420c. This allows the beam 420b to slide within the beams 420a, 420c. That is the beam 420b can telescopically engage the beams 420a, 420c and vice versa. The upright 440 (for example, portions thereof) can define a stepped hole 494 which is configured to receive and/or clamp the beams 420a, 420b, 420c (for example, portions thereof). With reference to FIGS. 33, 35, 36, and 37, the stepped hole 494 can be formed in and/or defined by the channels 458 and/or partial channels 459 of the shell portions 450, 452. As shown in at least FIGS. 36 and 37, each of the partial channels 459 can include one or more or a plurality of supports, such as ribs extending outward from and/or along a surface of the partial channels 459. The ribs can have a size, shape, and/or curvature that defines the stepped hole 494 (and/or portions thereof) and/or which conforms to a size, shape, and/or curvature of cross-sections of the beams 420a, 420b, 420c (and/or portions thereof). The stepped hole 494 formed in and/or defined by the partial channels 459 (and/or ribs) can be configured have a first size and/or shape 497 which is configured to match the size and/or shape of the any or both of beams 420a, 420c and a second size and/or shape 496 which is configured to match the shape of the beam 420b. This configuration allows the beams 420a, 420b, 420c to be adjusted and/or positioned relative to one another and then to be clamped in position with the over edge(s) of the beams 420a, 420c at least partially covered by the upright 440. The ends of the beams 420a, 420c may also locate axially with the upright 440 along a portion of the channel 458 or partial channels 459 that forms and/or defines an edge 499 of the stepped hole 304. The partial channels 459 can define a transition of a sized and/or shape of the stepped hole 494 at the edge(s) 499. This arrangement shown in FIG. 37 allows the tailgate enclosure 400 to have a width that can vary, which may allow the tailgate enclosure 400 to compensate for width variations in various vehicles. For example, depending on the width between opposing sidewalls 36, 38 of a given truck 30, ends of the beams 420a, 418a, 416a and/or ends of the beams 420c, 418c, 416c may be positioned within (and/or clamped) the stepped hole 494 defined by the partial channels 459 at different locations and/or positions when end uprights 408, 410 are mounted to the sidewalls 36, 38. In various embodiments, an adjustable width cross-member, such as that illustrated in FIG. 37 can have a cylindrical profile or a non-cylindrical profile such as that described and illustrated above.

With reference to FIGS. 34, 36, and 37, in some cases the central beams 420b, 418b, 416b have lengths that are greater than widths $W_2$, $W_4$, $W_6$ of flared portions 480, 484, 488 (for example, respectively). However, in some variations, the central beams 420b, 418b, 416b have lengths that are less than widths $W_2$, $W_4$, $W_6$ of flared portions 480, 484, 488 (for example, respectively). In some variations, the central beams 420b, 418b, 416b have lengths that are greater than widths $W_1$, $W_7$ of flared portions 480, 488 and/or greater than widths $W_3$, $W_5$ of the stem portions 482, 486.

Although the previous embodiments of the cargo tailgate enclosure 400 shown in FIGS. 24-37 have a generally U-shape that can be generally rigid, it can be appreciated by one skilled in the art that the cargo tailgate enclosure 400 may be foldable as to collapse to an altered shape when not in use. Such an embodiment can include folding connections near the transitions from side walls (e.g., 402, 404) to a back wall (e.g., 406). The foldable connections can be preferably configured such that the side walls can fold back and against the back wall. The foldable connections may be any suitable pivotal connections such as hinges or flexible inserts. Furthermore, any number of foldable connections can be used which may allow the tailgate extender to be folded down a substantially small size.

Although the cargo tailgate enclosure 400 has been disclosed in the context of certain preferred embodiments and examples, it will be understood by those skilled in the art that the cargo tailgate enclosure 400 extends beyond the specifically disclosed embodiments to other alternative embodiments and/or users of the invention and obvious modifications and equivalent thereof. In particular, while the cargo tailgate enclosure 400 has been described in the context of a particularly preferred embodiment, a skilled artisan will appreciate in view of the present disclosure that certain advantages, features and aspects of the cargo tailgate enclosure 400 may be realized in a variety of other applications, many of which have been noted above. Additionally, it is contemplated that various aspects and features of the invention described can be practiced separately, combined together, or substituted for one another, and that a variety of combinations and sub-combinations of the features and aspects can be made and still fall within the scope of the inventions. Thus, it is intended that the scope of the present invention herein disclosed, should not be limited by the particular disclosed embodiments described above but should be determined only by a fair reading of the claims.

What is claimed is:

1. A vehicle tailgate enclosure for use with a vehicle including a first sidewall, a second sidewall, a cargo bed, and a tailgate, the vehicle tailgate enclosure comprising:
a first upright configured to be secured to the first sidewall of the vehicle;
a second upright configured to be secured to the second sidewall of the vehicle;
a plurality of cross-members extending between the first and second uprights over at least a portion of the tailgate of the vehicle when the vehicle tailgate enclosure is in use, each of the plurality of cross-members vertically spaced apart from an adjacent one of the plurality of cross-members, each of the plurality of cross-members comprising:
a first beam connected to the first upright;
a second beam connected to the second upright; and
a central beam connected to the first and second beams; and
a third upright positioned along the plurality of cross-members between the first and second uprights, the third upright comprising:
a first portion comprising a first channel that receives a portion of the central beam of a first one of the plurality of cross-members, the first portion having a first width;
a second portion comprising a second channel that receives a portion of the central beam of a second one of the plurality of cross-members, the second portion having a second width; and
a third portion comprising a third channel that receives a portion of the central beam of a third one of the plurality of cross-members, the third portion having a third width;
wherein the first and third widths are different than the second width; and
wherein:
the first channel receives a portion of each of the first and second beams of the first one of the plurality of cross-members;
the second channel receives a portion of each of the first and second beams of the second one of the plurality of cross-members; and
the third channel receives a portion of each of the first and second beams of the third one of the plurality of cross-members.

2. The vehicle tailgate enclosure of claim 1, wherein:
the central beam of the first one of the plurality of cross-members extends within portions of the first and second beams of the first one of the plurality of cross-members;
the central beam of the second one of the plurality of cross-members extends within portions of the first and second beams of the second one of the plurality of cross-members; and
the central beam of the third one of the plurality of cross-members extends within portions of the first and second beams of the third one of the plurality of cross-members.

3. The vehicle tailgate enclosure of claim 1, wherein the third upright comprises a first shell and a second shell, the first and second shells secured to one another with a plurality of fasteners.

4. The vehicle tailgate enclosure of claim 1, wherein:
the first upright comprises a first pivot mount configured to allow the first upright to be pivotably mounted to the first sidewall of the vehicle; and
the second upright comprises a second pivot mount configured to allow the second upright to be pivotably mounted to the second sidewall of the vehicle.

\* \* \* \* \*